(12) United States Patent
Baek et al.

(10) Patent No.: US 11,636,626 B2
(45) Date of Patent: Apr. 25, 2023

(54) APPARATUS AND METHOD OF USING AI METADATA RELATED TO IMAGE QUALITY

(71) Applicant: SAMSUNG ELECTRONICS CO., LTD., Suwon-si (KR)

(72) Inventors: Sangwook Baek, Suwon-si (KR); Minsu Cheon, Suwon-si (KR); Yongsup Park, Suwon-si (KR); Jaeyeon Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 319 days.

(21) Appl. No.: 17/100,212

(22) Filed: Nov. 20, 2020

(65) Prior Publication Data
US 2021/0150287 A1    May 20, 2021

(30) Foreign Application Priority Data

Nov. 20, 2019  (KR) .................. 10-2019-0149886
Feb. 26, 2020  (KR) .................. 10-2020-0023848

(51) Int. Cl.
*G06K 9/62* (2022.01)
*G06T 9/00* (2006.01)
(Continued)

(52) U.S. Cl.
CPC .......... *G06T 9/002* (2013.01); *G06F 18/2415* (2023.01); *G06N 7/01* (2023.01);
(Continued)

(58) Field of Classification Search
None
See application file for complete search history.

(56) References Cited

U.S. PATENT DOCUMENTS 10,249,042 B2 *  4/2019  Jung ...................... G06V 10/82
10,275,676 B2 *  4/2019  Venkataraman .......... G06T 9/00
(Continued)

FOREIGN PATENT DOCUMENTS

KR    10-2018-0001428 A    1/2018
KR    10-2018-0052651 A    5/2018
(Continued)

OTHER PUBLICATIONS

Xintao Wang et al., "Recovering Realistic Texture in Image Super-resolution by Deep Spatial Feature Transform", CVPR 2018, Apr. 9, 2018, pp. 1-10 (10 pages total).
(Continued)

*Primary Examiner* — Feng Niu
(74) *Attorney, Agent, or Firm* — Sughrue Mion, PLLC

(57) ABSTRACT

An image providing apparatus configured to generate, by using a first artificial intelligence (AI) network, AI metadata including class information and at least one class map, in which the class information includes at least one class corresponding to a type of an object among a plurality of predefined objects included in a first image and the at least one class map indicates a region corresponding to each class in the first image, generate an encoded image by encoding the first image, and output the encoded image and the AI metadata through the output interface.

20 Claims, 20 Drawing Sheets

(51) Int. Cl.

| | | |
|---|---|---|
| *H04N 19/30* | (2014.01) | |
| *H04N 19/136* | (2014.01) | |
| *G06V 10/82* | (2022.01) | |
| *G06V 10/764* | (2022.01) | |
| *H04N 19/20* | (2014.01) | |
| *G06V 20/60* | (2022.01) | |
| *G06T 7/10* | (2017.01) | |
| *G06V 10/70* | (2022.01) | |
| *G06V 10/72* | (2022.01) | |
| *G06F 18/2415* | (2023.01) | |
| *G06N 7/01* | (2023.01) | |
| *G06V 10/774* | (2022.01) | |
| *G06V 10/44* | (2022.01) | |
| *G06V 20/00* | (2022.01) | |
| *G06V 20/70* | (2022.01) | |

(52) U.S. Cl.
CPC ............. *G06T 7/10* (2017.01); *G06V 10/454* (2022.01); *G06V 10/70* (2022.01); *G06V 10/72* (2022.01); *G06V 10/764* (2022.01); *G06V 10/7747* (2022.01); *G06V 10/82* (2022.01); *G06V 20/00* (2022.01); *G06V 20/60* (2022.01); *G06V 20/70* (2022.01); *H04N 19/136* (2014.11); *H04N 19/20* (2014.11); *H04N 19/30* (2014.11)

(56) References Cited

U.S. PATENT DOCUMENTS

| | | | | |
|---|---|---|---|---|
| 10,373,231 | B2* | 8/2019 | Jensen | G09B 19/0023 |
| 10,645,384 | B2* | 5/2020 | Nishida | H04N 19/119 |
| 10,878,296 | B2* | 12/2020 | Murphy | G06N 3/08 |
| 11,042,586 | B2* | 6/2021 | Hohwald | G06N 3/08 |
| 11,132,734 | B2* | 9/2021 | Jensen | G06Q 30/0631 |
| 11,504,749 | B2* | 11/2022 | Murad | G09B 5/02 |
| 2007/0058873 | A1* | 3/2007 | Kondo | H04N 19/60 |
| | | | | 375/E7.176 |
| 2016/0027088 | A1* | 1/2016 | Jensen | G06Q 30/0631 |
| | | | | 705/26.7 |
| 2017/0091951 | A1 | 3/2017 | Yoo et al. | |
| 2018/0075581 | A1 | 3/2018 | Shi et al. | |
| 2018/0189325 | A1* | 7/2018 | Hohwald | G06F 16/5838 |
| 2018/0197035 | A1* | 7/2018 | Venkataraman | G06V 10/20 |
| 2018/0249158 | A1 | 8/2018 | Huang et al. | |
| 2018/0260954 | A1* | 9/2018 | Jung | G16H 70/60 |
| 2019/0230354 | A1 | 7/2019 | Kim | |
| 2019/0325259 | A1* | 10/2019 | Murphy | G06N 20/00 |
| 2019/0362411 | A1* | 11/2019 | Jensen | G06F 16/5838 |
| 2020/0222949 | A1* | 7/2020 | Murad | G06K 9/6267 |
| 2020/0349673 | A1* | 11/2020 | Yoo | G06N 3/0454 |
| 2022/0005101 | A1* | 1/2022 | Jensen | G06Q 30/0641 |

FOREIGN PATENT DOCUMENTS

| | | |
|---|---|---|
| KR | 10-2018-0100976 A | 9/2018 |
| KR | 10-2018-0108288 A | 10/2018 |
| KR | 10-2019-0024400 A | 3/2019 |
| KR | 20190024400 A * | 3/2019 |
| KR | 10-2019-0089777 A | 7/2019 |
| KR | 10-1999607 B1 | 7/2019 |
| WO | 2019099428 A1 | 5/2019 |
| WO | 2019136623 A1 | 7/2019 |

OTHER PUBLICATIONS

"Subjective video quality assessment methods for multimedia applications", Recommendation ITU-T p. 910, Apr. 6, 2008, pp. 1-34 (42 pages total).

Xintao Wang et al., "ESRGAN: Enhanced Super-Resolution Generative Adversarial Networks", ECCV 2018, Sep. 17, 2018, pp. 1-23 (23 pages total).

Communication dated Nov. 30, 2020 by the Korean Intellectual Property Office in Korean Patent Application No. 10-2020-0023848.

International Search Report and Written Opinion dated Feb. 24, 2021 by the International Searching Authority in International Patent Application No. PCT/KR2020/016262. (PCT/ISA/220/210/237).

Communication dated Oct. 7, 2022 issued by the European Patent Office in EP Application No. 20890334.4.

Ghosh, S., et al., "Understanding Deep Learning Techniques for Image Segmentation", ACM Computing Surveys, vol. 52, No. 4, Article 73, Aug. 2019, p. 73:1-73:35.

* cited by examiner

APPARATUS AND METHOD OF USING AI METADATA RELATED TO IMAGE QUALITY

CROSS-REFERENCE TO RELATED APPLICATIONS

This application is based on and claims priority under 35 U.S.C. § 119 to Korean Patent Application No. 10-2019-0149886, filed on Nov. 20, 2019, and Korean Patent Application No. 10-2020-0023848, filed on Feb. 26, 2020, in the Korean Intellectual Property Office, the disclosures of which are herein incorporated by reference in their entireties.

BACKGROUND

1. Field

Embodiments of the disclosure relate to an image providing apparatus, a control method for the image providing apparatus, an image reproducing apparatus, a control method for the image reproducing apparatus, and a computer program. Embodiments of the disclosure also provide an apparatus and a method for using artificial intelligence (AI) metadata related to image quality.

2. Description of Related Art

When a digital image is transmitted between devices via a network, various techniques such as encoding, image down-scaling, etc., are used to reduce the amount of data. In a process of reducing the amount of data of an image and reconstructing and reproducing the image in an apparatus having received the image, the quality of the reconstructed image may fail to match that of the original image, such that deterioration in image reproduction quality may occur.

In order for an image reproducing apparatus to improve the quality of the reconstructed image, when an encoded and input image is being reproduced, an attempt is made to improve the image quality through image processing based on features of the input image. However, image processing by extracting image features from the input image may require significant resources and processing time, thereby increasing a processing load and lowering a processing speed in the image reproducing apparatus.

SUMMARY

Embodiments of the disclosure lightweight an artificial intelligence (AI) network for improving image quality that is used to generate AI metadata.

Moreover, embodiments of the disclosure provide an AI network that is used to process image quality in an image reproducing apparatus.

Furthermore, embodiments of the disclosure improve the performance of an AI network for improving image quality by generating AI metadata from an original image.

Additional aspects will be set forth in part in the description which follows and, in part, will be apparent from the description, or may be learned by practice of the presented embodiments of the disclosure.

According to an aspect of an embodiment of the disclosure, an image providing apparatus includes a memory storing one or more instructions, one or more processors configured to execute the one or more instructions stored in the memory, and an output interface, in which the one or more processors are configured to, by executing the one or more instructions, generate, by using a first artificial intelligence (AI) network, AI metadata comprising class information and at least one class map, wherein the class information comprises at least one class corresponding to a type of an object included in a first image among a plurality of predefined objects and the at least one class map indicates a region corresponding to each class among the at least one class in the first image, generate an encoded image by encoding the first image, and output the encoded image and the AI metadata through the output interface.

According to an embodiment of the disclosure, the one or more processors may be configured to, by executing the one or more instructions, input the first image to the first AI network and generate a plurality of segmentation probability maps for each type of the plurality of predefined objects, define at least one class corresponding to the type of the object included in the first image, based on the plurality of segmentation probability maps, generate the class information comprising the at least one class, and generate the at least one class map for each class of the at least one class from the plurality of segmentation probability maps.

According to an embodiment of the disclosure, the one or more processors may be configured to, by executing the one or more instructions, calculate an average value of pixels except for at least one pixel having a value of 0 for each of the plurality of segmentation probability maps and select a subset of objects from among the plurality of predefined objects and define the at least one class, based on a magnitude of the average value of each of the plurality of segmentation probability maps.

According to an embodiment of the disclosure, the one or more processors may be configured to, by executing the one or more instructions, map at least some objects from among objects other than the subset of objects among the plurality of predefined objects to the at least one class and generate the at least one class map by combining a segmentation probability map of an object mapped to the at least one class with the segmentation probability map of a class to which the object is mapped.

According to an embodiment of the disclosure, the one or more processors are configured to, by executing the one or more instructions, generate a segmentation probability map for a frequency for each of a plurality of predefined frequency domains from the first AI network and generate AI metadata based on the segmentation probability map for the frequency, in which the AI metadata includes frequency information, which includes information about a frequency domain for the first image, and at least one frequency map corresponding to each frequency domain included in the frequency information.

According to an embodiment of the disclosure, the first image may include a plurality of frames, and the class information and the at least one class map may be generated for each of the plurality of frames, and the one or more processors may be configured to, by executing the one or more instructions, define at least one sequence comprising at least one image from the plurality of images and generate, for each sequence among the at least one sequence, sequence class information indicating information about a class included in the at least one image included in the sequence, and frame class information indicating information about a class included in each of the at least one image included in the sequence, in which the frame class information indicates a combination of classes included in a frame among classes included in the sequence class information and comprises a number of bits less than the sequence class information.

According to an embodiment of the disclosure, the one or more processors may be configured to, by executing the one or more instructions, generate, based on the at least one class map, a lightweighted class map in which each pixel has a representative value corresponding to a class among the at least one class, generate lightweighted AI metadata including the class information and the lightweighted class map, and output the encoded image and the lightweighted class map through the output interface.

According to an embodiment of the disclosure, the first AI network may include a first-sub AI network including at least one convolution layer and at least one maximum pooling layer, and configured to generate a feature map from the first image and a second-sub AI network including a first layer group that includes at least one convolution layer and at least one activation layer and receives and processes the feature map from the first-sub AI network, an up-scaler configured to upscale an output of the first layer group, and a second layer group that includes at least one convolution layer and at least one minimum pooling layer and receives an output of the up-scaler and generates a segmentation probability map for each of the plurality of predefined objects.

According to an embodiment of the disclosure, the first AI network and the second AI network may be trained jointly with each other, and the second AI network may be included in a device configured to receive the encoded image and the AI metadata and then decode the encoded image, and may perform image-quality processing on image data of the AI metadata, the image data corresponding to the encoded image.

According to an embodiment of the disclosure, the one or more processors may be configured to, by executing the one or more instructions, generate the encoded image by downscaling and encoding the first image.

According to another aspect of an embodiment of the disclosure, a control method for an image providing apparatus includes generating, by using a first artificial intelligence (AI) network, AI metadata comprising class information and at least one class map, wherein the class information comprises at least one class corresponding to a type of an object included in a first image among a plurality of predefined objects and the at least one class map indicates a region corresponding to each class among the at least one class in the first image, generating an encoded image by encoding the first image, and outputting the encoded image and the AI metadata.

According to another aspect of an embodiment of the disclosure, an image reproducing apparatus includes a memory storing one or more instructions, one or more processors configured to execute the one or more instructions stored in the memory, an input interface configured to receive an encoded image corresponding to a first image and artificial intelligence (AI) metadata corresponding to the encoded image, and an output interface, in which the AI metadata includes class information and at least one class map, in which the class information comprises at least one class corresponding to a type of an object included in the first image among a plurality of predefined objects and the at least one class map indicates a region corresponding to each class among the at least one class in the first image, and the one or more processors are configured to, by executing the one or more instructions, generate a second image corresponding to the first image by decoding the encoded image, generate, by using a second AI network, a third image on which image-quality enhancement is performed, from the second image and the AI metadata, and output the third image through the output interface.

According to an embodiment of the disclosure, the second AI network may include a first-sub AI network including at least one convolution layer, at least one modulation layer, and at least one activation layer, and the at least one modulation layer may process a feature map input to the at least one modulation layer, based on a modulation parameter set generated from the AI metadata.

According to an embodiment of the disclosure, the first-sub AI network may include a plurality of modulation layers, and the second AI network may include a modulation parameter generation network corresponding to each of the plurality of modulation layers from the AI metadata, and each modulation parameter generation network may generate the modulation parameter set for a corresponding modulation layer.

According to an embodiment of the disclosure, the modulation parameter set may include a first operation modulation parameter combined with a data value of an input feature map through multiplication and a second operation modulation parameter combined with a result of the multiplication of the first operation modulation parameter and the data value of the input feature map through addition, and the at least one modulation layer may process the input feature map, based on the first operation modulation parameter and the second operation modulation parameter.

According to an embodiment of the disclosure, the first-sub AI network may include a plurality of residual blocks, and each residual block of the plurality of residual blocks may include a main stream including at least one convolution layer, at least one modulation layer, and at least one activation layer and generating a residual-version processing result value obtained by processing the plurality of residual blocks, and at least one second skip processing path generating a prediction-version processing result value by bypassing at least one layer included in a block, and the first-sub AI network may include at least one first skip processing path generating a prediction-version processing result value by skipping at least one residual block among the plurality of residual blocks.

According to an embodiment of the disclosure, the second AI network may include an up-scaler configured to receive an output of the first-sub AI network and perform upscaling and a second image-quality processor configured to generate and output a third image by receiving an output of the up-scaler, and including at least one machine-trained layer.

According to an embodiment of the disclosure, AI metadata input through the input interface may include a lightweighted class map in which at least one class map for each of the at least one class is lightweighted, and the one or more processors are configured to, by executing the one or more instructions, generate a reconstructed class map for each class among the at least one class from the lightweighted class map, and the reconstructed class map may include a value indicating whether each pixel corresponds to a class.

According to another aspect of an embodiment of the disclosure, a control method for an image reproducing apparatus includes receiving an encoded image corresponding to a first image and artificial intelligence (AI) metadata corresponding to the encoded image, generating a second image corresponding to the first image by decoding the encoded image, generating a third image on which image-quality enhancement is performed, from the second image and the AI metadata, by using a second AI network, and outputting the third image, in which the AI metadata includes class information and at least one class map, in which the class information comprises at least one class corresponding to a type of an object included in the first image among a plurality of predefined objects and the at least one class map indicates a region corresponding to each class among the at least one class in the first image.

According to another aspect of an embodiment of the disclosure, a computer-readable recording medium has recorded thereon a computer program instructions for, when executed by a processor, performing a control method for an image reproducing apparatus, the control method including receiving an encoded image corresponding to a first image and artificial intelligence (AI) metadata corresponding to the encoded image, generating a second image corresponding to the first image by decoding the encoded image, generating a third image on which image-quality enhancement is performed, from the second image and the AI metadata, by using a second AI network, and outputting the third image, in which the AI metadata includes class information and at least one class map, in which the class information comprises at least one class corresponding to a type of an object included in the first image among a plurality of predefined objects and the at least one class map indicates a region corresponding to each class among the at least one class in the first image.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
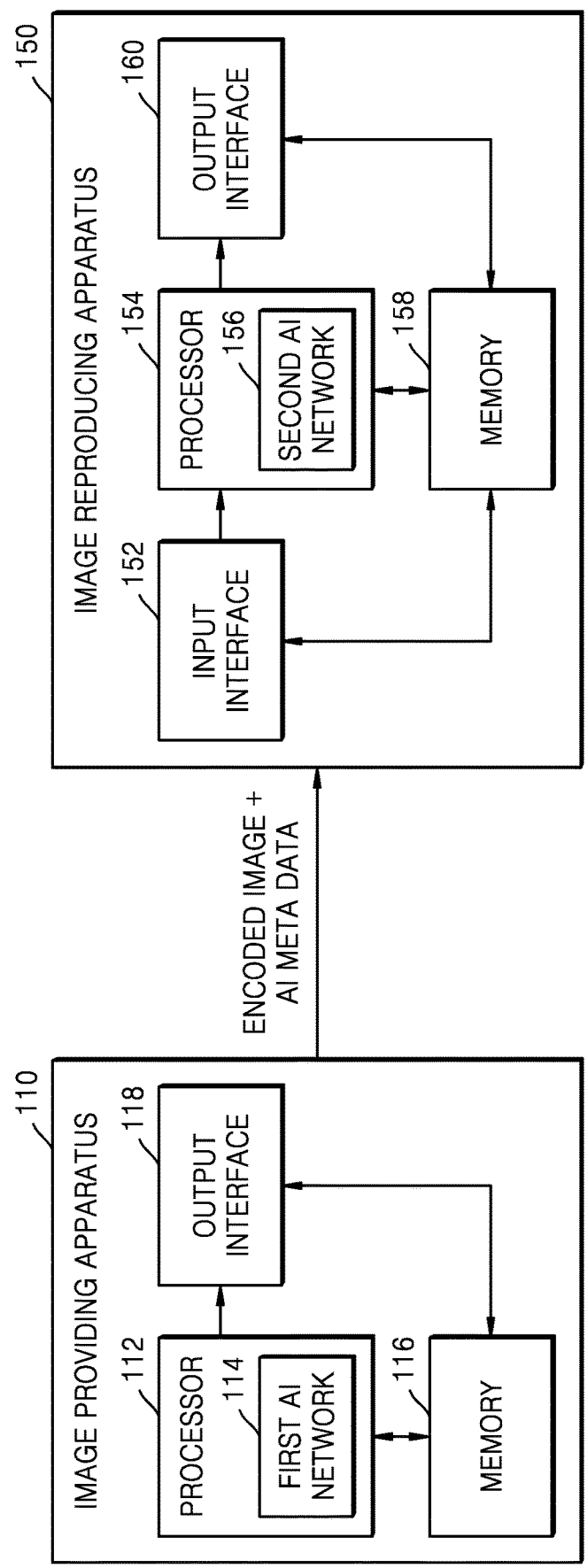
FIG. 1 is a diagram illustrating a structure of an image providing apparatus and an image reproducing apparatus, according to an embodiment of the disclosure.

The disclosure describes the principle of embodiments to allow those of ordinary skill in the art to carry out the embodiments of the disclosure. The embodiments of the disclosure may be implemented in various forms.

Throughout the disclosure, an identical reference numeral will indicate an identical element. The disclosure does not describe all elements of embodiments of the disclosure, and general information in the technical field of the disclosure and redundant information across the embodiments of the disclosure will be omitted. A "module" or "unit" used herein may be implemented with software, hardware, or firmware, and depending on embodiments of the disclosure, a plurality of "modules" or "units" may be implemented with one unit or element or one "module" or "unit" may include a plurality of elements.

In a description of embodiments of the disclosure, a detailed description of related well-known techniques will be omitted to avoid unnecessarily obscuring the subject matter of the disclosure. In addition, numbers (e.g., $1^{st}$, $2^{nd}$, first, second, etc.) used in the description of the specification are merely identification symbols or labels for distinguishing one element from another element.

Throughout the disclosure, the expression "at least one of a, b or c" indicates only a, only b, only c, both a and b, both a and c, both b and c, all of a, b, and c, or variations thereof.

Moreover, in the disclosure, when a component is mentioned as being "connected" or "coupled" to another component, the component may be directly connected or directly coupled to the another component, but unless described otherwise, it should be understood that the component may also be connected or coupled to the another component via still another component therebetween.

Hereinafter, the operating principle and various embodiments of the disclosure will be described in detail with reference to the accompanying drawings.

In the disclosure, a 'first artificial intelligence (AI) network' and a 'second AI network' may mean an AI model machine-trained using multiple training data. The first AI network and the second AI network may include various machine-trained models, for example, a deep neural network (DNN) architecture.

In addition, in the present specification, an 'image' or a 'picture' may correspond to a still image, a moving image including a plurality of continuous still images (or frames), or video.

Herein, a 'first image' may mean an image to be encoded, and an 'encoded image' may mean an image generated by encoding the first image. A 'second image' may mean an image generated by decoding the encoded image, and a 'third image' may mean an image resulting from quality enhancement processing on the second image.

FIG. 1 is a diagram illustrating a structure of an image providing apparatus and an image reproducing apparatus, according to an embodiment of the disclosure.

According to an embodiment of the disclosure, an image providing apparatus 110 may generate an encoded image and AI metadata from a first image, which may be an original image, and transmit the encoded image and the AI metadata to an image reproducing apparatus 150. The image reproducing apparatus 150 may receive the encoded image and the AI metadata, decode the encoded image and perform image-quality enhancement processing thereon using the AI metadata, and thus output a reproduced image. The image providing apparatus 110 and the image reproducing apparatus 150 may be wired or wirelessly connected through a communication network or various input and output interfaces.

The image providing apparatus 110 may be implemented as various types of electronic devices. According to an embodiment of the disclosure, the image providing apparatus 110 may correspond to a server of a service provider or broadcasting provider that provides image contents. The image providing apparatus 110 may be implemented by a physically independent electronic device or a cloud server.

The image providing apparatus 110 may include a processor 112, a memory 116, and an output interface 118.

The processor 112 may control an overall operation of the image providing apparatus 110. The processor 112 may be implemented with one or more processors. The processor 112 may perform operations by executing programs, an instruction, or a command stored in the memory 116.

The processor 112 may receive a first image, extract AI metadata related to image quality processing, and generate an encoded image by encoding the first image. The processor 112 may extract the AI metadata from the first image by using a first AI network 114.

The AI metadata may mean metadata related to image-quality enhancement processing of the first image. The AI metadata may include information related to a type of an object existing within the image. The AI metadata may be extracted from the first image by using the first AI network 114.

The processor 112 may process input image data by using the first AI network 114. According to an embodiment of the disclosure, the first AI network 114 may be stored in the image providing apparatus 110. According to another embodiment of the disclosure, the first AI network 114 may be included in another device, and the image providing apparatus 110 may use the first AI network 114 included in an external device through a communication interface, etc. Herein, a description will be made of an embodiment of the disclosure in which the first AI network 114 is included in the image providing apparatus 110, but the embodiment of the disclosure is not limited thereto.

The first AI network 114 may be an AI model machine-trained using multiple training data. The first AI network 114 may include machine-trained models of various structures, for example, a DNN architecture. The first AI network 114 may have an architecture, for example, a convolutional neural network (CNN), a recurrent neural network (RNN), etc. The first AI network 114 may use a machine-trained algorithm such as a spatial feature transform generative adversarial network (SFTGAN), an enhanced super-resolution generative adversarial network (ESRGAN), etc.

The first AI network 114 may access storage space and a processor that processes data stored in each storage space. The first AI network 114 may define at least one node and layer and define data processing between the node and the layer, based on an algorithm and a parameter that define processing of the data. The first AI network 114 may include a plurality of nodes and a plurality of layers, and generate output data by processing input data based on data delivery between the plurality of nodes and the plurality of layers.

The memory 116 may store a computer program instruction, information, and contents required for operations of the image providing apparatus 110. The memory 116 may include a volatile and/or nonvolatile memory, or a combination thereof. The memory 116 may be implemented in various forms of storage media. The memory 116 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and so forth.

The output interface 118 may output data or a control signal generated or processed in the image providing apparatus 110. The output interface 118 may output an encoded image and AI metadata generated in the image providing apparatus 110. The output interface 118 may include various types of output interfaces such as a wired or wireless communication interface, a display interface (e.g., HDMI), a speaker interface (e.g., S/PDIF), a touch screen and user interface, etc.

According to an embodiment of the disclosure, the output interface 118 may include a communicator or a communication interface. The output interface 118 may output data or a signal to an external device such as the image reproducing apparatus 150 through a communication interface. The communication interface may output an encoded image and AI metadata to the image reproducing apparatus 150 directly or via another device.

The image reproducing apparatus 150 may be implemented with various types of electronic devices. According to an embodiment of the disclosure, the image reproducing apparatus 150 may correspond to a user terminal. The image reproducing apparatus 150 may be implemented with electronic devices in various forms, such as a portable communication terminal, a smart phone, a wearable device, a laptop computer, a desktop computer, a tablet personal computer (PC), a kiosk, etc.

The image reproducing apparatus 150 may include an input interface 152, a processor 154, a memory 158, and an output interface 160.

The input interface 152 may receive data or a control signal and transmit the same to the processor 154. The input interface 152 may receive the encoded image and the AI metadata output from the image providing apparatus 110 via the output interface 118.

The input interface 152 may include a communicator or a communication interface. The input interface 152 may also include an input and output interface such as a touch screen, a keyboard, a mouse, a touch pad, etc.

The processor 154 may control an overall operation of the image reproducing apparatus 150. The processor 154 may be implemented with one or more processors. The processor 154 may perform a certain operation by executing a program, an instruction or a command stored in the memory 158.

The processor 154 may process input image data by using the second AI network 156. The processor 154 may receive the encoded image and the AI metadata received from the image providing apparatus 110, obtain a second (decoded) image by decoding the encoded image, and obtain a third image by performing image-quality enhancement processing on the decoded image by using the AI metadata. The processor 154 may obtain the output of the third image from the input of the second image and the AI metadata by using the second AI network 156.

According to an embodiment of the disclosure, the image reproducing apparatus 150 may receive a low-resolution encoded image and perform upscaling on the decoded image obtained from the encoded image. The processor 154 may perform image quality processing and upscaling on the decoded image. The processor 154 may perform image quality processing and upscaling by using the second AI network 156.

According to an embodiment of the disclosure, the second AI network 156 may be stored in the image reproducing apparatus 150. According to another embodiment of the disclosure, the second AI network 156 may be included in another device, and the image reproducing apparatus 150 may access the second AI network 156 included in an external device through a communication interface, etc. Herein, a description will be made of an embodiment in which the second AI network 156 is included in the image providing apparatus 150, but the embodiment of the disclosure is not limited thereto.

The second AI network 156 may be an AI model machine-trained using multiple training data. The second AI network 156 may include machine-trained models of various structures, for example, a DNN architecture. The second AI network 156 may have an architecture, for example, a CNN, an RNN, etc. The second AI network 156 may use a machine-trained algorithm such as an SFTGAN, an ESR-GAN, etc.

The second AI network 156 may utilize data storage space and a processor that processes data stored in the storage space. The second AI network 156 may define at least one node and layer based on an algorithm and a parameter that define processing between data of the storage spaces, and define data processing between the node and the layer. The second AI network 156 may include a plurality of nodes and a plurality of layers, and generate output data by processing input data based on data delivery between the plurality of nodes and the plurality of layers.

The memory 158 may store a computer program instruction, information, and contents required for operations of the image reproducing apparatus 150. The memory 158 may include a volatile and/or nonvolatile memory, or a combination thereof. The memory 158 may be implemented with various forms of storage media as described in relation to the memory 116 of the image providing apparatus 110 above.

The output interface 160 may output data or a control signal generated or processed in the image reproducing apparatus 150. The output interface 160 may output the third image from the image reproducing apparatus 150. The output interface 160 may include various types of output interfaces such as a communication interface, a display, a speaker, a touch screen, etc.

According to an embodiment of the disclosure, the output interface 160 may correspond to a display and output the third image by displaying the third image.

According to another embodiment of the disclosure, the output interface 160 may include a wired or wireless communicator or a communication interface. The output interface 160 may transmit the third image to an external device, a display device, a multimedia device, etc., through the communication interface. For example, the output interface 160 may transmit display data of the third image to an external display device for reproduction of an image thereon.

Figure 2:
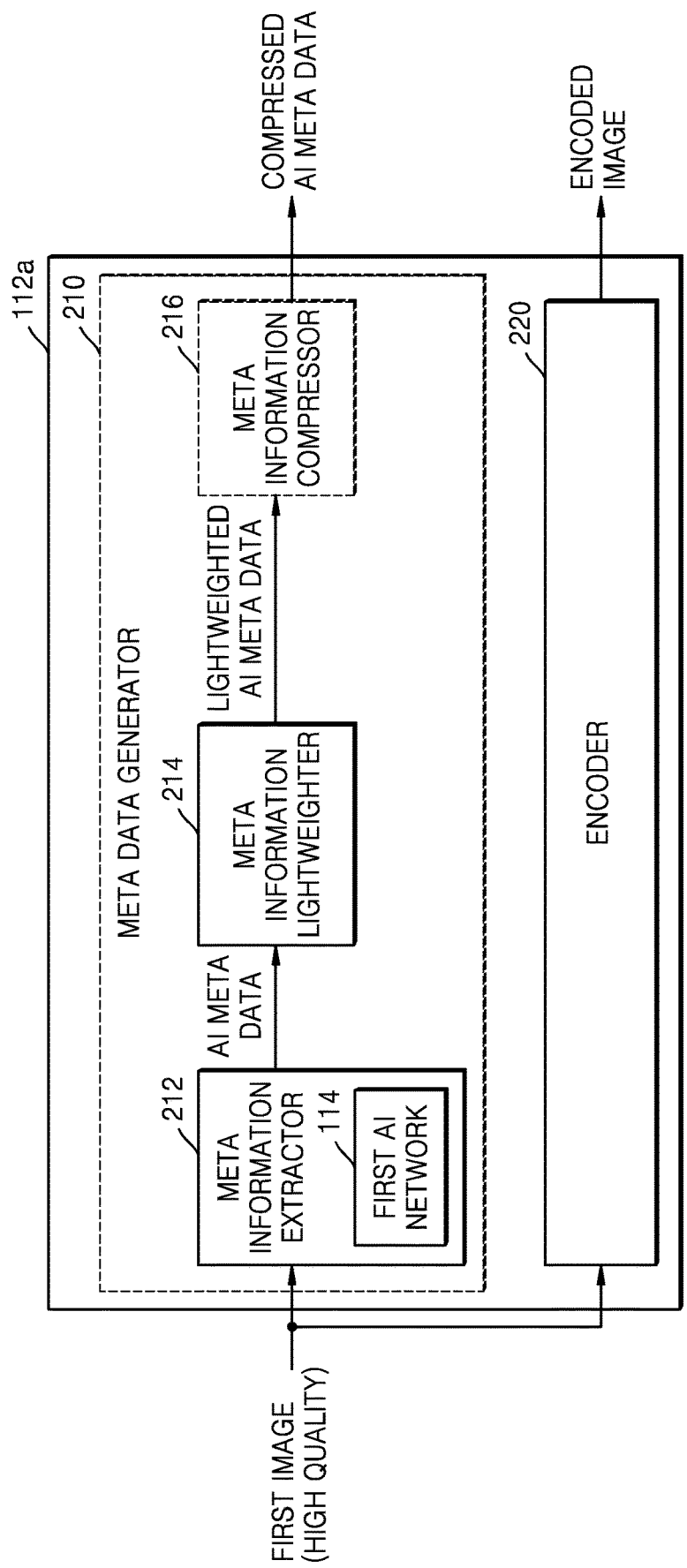
FIG. 2 is a diagram illustrating a structure of a processor of an image providing apparatus, according to an embodiment of the disclosure.

FIG. 2 is a diagram illustrating a structure of a processor of an image providing apparatus, according to an embodiment of the disclosure.

In the disclosure, blocks in the processor 112 (112a) or 154 may correspond to at least one software processing block or at least one dedicated hardware processor, and a combination thereof. In the disclosure, the blocks illustrating the processor 112 or 154 are merely a schematic example of a software processing unit for executing the embodiments of the disclosure, and a processing unit for executing the embodiments of the disclosure as well as the processing unit disclosed in the disclosure may be implemented via any combination of hardware and software.

According to an embodiment of the disclosure, the processor 112 of the image providing apparatus 110 may include a metadata generator 210 and an encoder 220. The metadata generator 210 may receive the first image and generate AI metadata.

According to an embodiment of the disclosure, the first image may be down-scaled and encoded by a processor 112a. For example, the first image may be down-scaled by the metadata generator 210, the encoder 220, or a separate down-scaler processing element. According to an embodiment of the disclosure, the metadata generator 210 may generate AI metadata from a high-resolution, high-quality image that has not yet been down-scaled. The image providing apparatus 110 may generate AI metadata without a loss of information related to image quality by generating the AI metadata from the (original) high-resolution, high-quality image.

The metadata generator 210 may use the first AI network 114 to perform partial processing. The first AI network 114 may a component of the processor 112a, a separate dedicated processor in the image providing apparatus 110, or a separate processing element of an external device.

The metadata generator 210 may include a meta information extractor 212 and a meta information lightweighter 214. According to an embodiment of the disclosure, the metadata generator 210 may further include a meta information compressor 216. The meta information compressor 216 may be omitted according to an embodiment of the disclosure.

The meta information extractor 212 may extract the AI metadata from the first image. The AI metadata may include class information indicating a type of an object included in the first image and a class map indicating a class corresponding to each region in the first image. The class map may include information that defines a class corresponding to each pixel of a pixel array corresponding to the first image. The class map may be generated for each of at least one class included in the class information of the first image. For example, four classes of (1) default, (2) sky, (3) grass, and (4) plant may be defined for the first image, such that when class information defines the four classes, a total of four class maps may be generated for the classes of default, sky, grass, and plant, respectively.

The meta information extractor 212 may detect an object from the first image and define a certain number of classes corresponding to detected objects, such that an object, which is not defined as a class, may be mapped to a certain class. An object may indicate a subject included in an image. A type of an object may be defined variously according to an embodiment of the disclosure, and may include objects frequently appearing in images, for example, sky, water, grass, mountain, a building, plant, an animal, etc. When an object corresponding to water is detected from the first image, but the water object is not included in class information due to a low number of pixels corresponding to the water object, a region corresponding to the water object may be mapped to one of classes defined for the first image. The class map may be implemented in the form of a probability map indicating a probability corresponding to a class for each pixel. For example, the class map corresponding to sky may indicate a probability of each pixel corresponding to sky. A resolution of the class map may be the same as or less than a resolution of the first image.

The meta information extractor 212 may extract the AI metadata from the first image by using a first AI network 114. According to an embodiment of the disclosure, the metadata extractor 212 may use the first AI network 114 to extract the class map from the first image and the class information.

The meta information extractor 212 may generate AI metadata, in which the AI metadata may include class information and a plurality of class maps corresponding to each class.

The meta information lightweighter 214 may perform lightweighting to reduce the volume or data size of the AI metadata extracted from the meta information extractor 212. The meta information lightweighter 214 may lightweight the AI metadata by reducing the number of bits of the AI metadata by lightweighting the plurality of class maps. The meta information lightweighter 214 may generate the lightweighted class map by defining a representative value for each position (pixel) in one map. A representative value of the lightweighted class map indicates a class corresponding to each pixel. Thus, the lightweighted AI metadata may include the lightweighted class map and class information.

The meta information compressor 216 may reduce a width and a length of the class map that is lightweighted by the meta information lightweighter 214, thus reducing the size of the lightweighted class map. The meta information compressor 216 may compress the lightweighted class map by applying a lossless compression scheme used in image compression. The meta information compressor 216 may generate compressed AI metadata by compressing the lightweighted class map and class information, and output the generated compressed AI metadata. Thus, the compressed AI metadata may include the lightweighted class map and class information.

The encoder 220 may generate the encoded image by encoding the first image. The encoder 220 may encode the first image by using various types of image encoding algorithms. The encoder 220 may generate predicted data by performing prediction encoding on the first image, generating residual data corresponding to a difference between the first image and the predicted data, transforming the residual data, which is a spatial-domain component, into a frequency-domain component, quantizing the residual data transformed into the frequency-domain component, and entropy-encoding the quantized residual data. This encoding process may be implemented by any one of various image compression methods using frequency conversion, such as Moving Picture Experts Group (MPEG)-2, H. 264 Advanced Video Coding (AVC), MPEG-4, H.265/high efficiency video coding (HEVC), VC-1, VP8, VP9, AOMedia Video 1 (AV1), etc.

The compressed AI metadata may be output as contained in a header of the encoded image or may be output separately apart from data of the encoded image. According to an embodiment of the disclosure, the meta information extractor 212 may generate image feature information and an image feature map corresponding to another type of an image feature as well as the class information and the class map, in which the AI metadata may include additional image feature information and image feature map. The additional image feature may include at least one or a combination of a frequency, a texture, semantics, or a photographing parameter.

According to an embodiment of the disclosure, the meta information extractor 212 may generate the frequency information and the frequency map by analyzing the frequency information from the first image. The AI metadata may include the frequency information and the frequency map. The frequency information may include information about frequency regions included in the first image. The frequency map may indicate a probability of corresponding to each frequency region in the first image. For example, five frequency regions may be defined, and five frequency maps corresponding to the respective frequency regions may be generated. According to an embodiment of the disclosure, a low-frequency region, which is a flat region in an image, may be excluded from the image feature information due to low sophistication enhancement based on image quality processing, and the image feature information may be defined for a high frequency region greater than a certain frequency.

According to another embodiment of the disclosure, the meta information extractor 212 may generate texture information and a texture map by analyzing the texture information of the first image. The AI metadata may include the texture information and the texture map. The texture information may be information corresponding to a density in each region of the first image. The meta information extractor 212 may generate the texture information according to a density value by calculating a density from each region of the first image. A high density may indicate a high complexity in a corresponding region and existence of various patterns. The density, spatial information (SI), may be calculated based on Equation 1.

$$\text{Spatial Information}(SI) = \text{stdev}[\text{Sobel}(I_{HR})] \qquad [\text{Equation 1}]$$

To calculate the density, the first image may be filtered using a Sobel filter $\text{Sobel}(I_{HR})$. Herein, $I_{HR}$ may indicate an image input to the filter, and in the current embodiment of the disclosure, may correspond to the first image. Next, for pixels in the first image processed using the Sobel filter, a standard deviation $\text{stdev}[\text{Sobel}(I_{HR})]$ may be calculated. According to a distribution of densities, certain regions corresponding to the densities may be defined, and regions of the densities detected in the first region may be included in texture information. The texture map is map indicating a region of the first image corresponding to each density region included in the texture information. The texture map may be expressed in the form of a probability map.

According to another embodiment of the disclosure, the meta information extractor 212 may extract photographing parameter information applied to the first image and photographing environment information. The meta information extractor 212 may record the extracted photographing parameter information and photographing environment information in the AI metadata. A photographing parameter may include, for example, a zoom parameter, iris information, focal length information, flash use information, white balance information, ISO information, exposure time information, photographing mode information, out-focusing information, auto-focusing (AF) information, auto-exposure (AE) information, character detection information, scene information, etc. The photographing environment information may include illumination information. The image feature map may be generated together with photographing parameter information or photographing environment information when the image feature map may define a value corresponding to each pixel in the first image. When the value corresponding to each pixel in the first image may not be defined, an image feature value may be defined for the first image. For example, for a zoom parameter, iris information, focal length information, flash use information, white balance information, ISO information, exposure time information, photographing mode information, out-focusing information, AF information, AE information, scene information, and illumination information, the image feature value corresponding to the first image may be defined. In the character detection information, an image feature map indicating a character-detected region in the first image or an image feature value indicating coordinates of the character-detected region may be defined.

In the disclosure, a description will be focused on an embodiment of the disclosure in which the meta information extractor 212 generates AI metadata including class information and a class map. However, the disclosure is not limited to the class information and the class map as the AI metadata.

Figure 3:
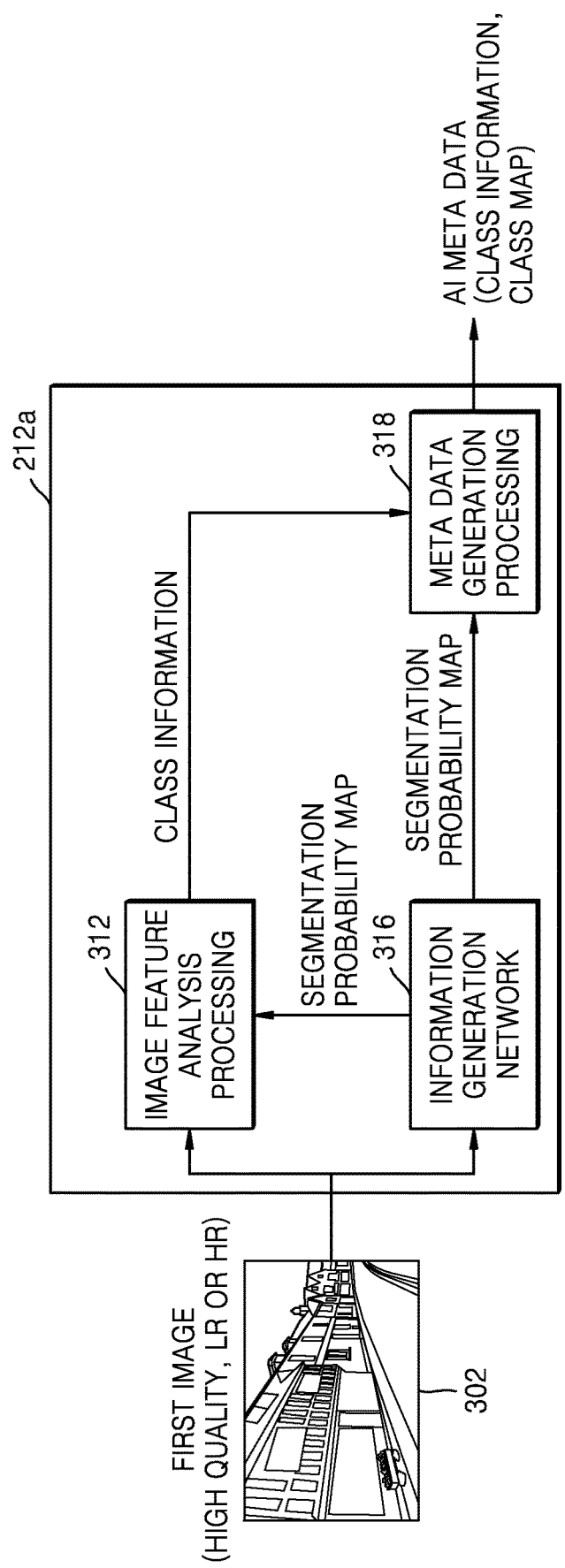
FIG. 3 illustrates an operation of a meta information extractor, according to an embodiment of the disclosure.

FIG. 3 illustrates an operation of a meta information extractor according to an embodiment of the disclosure.

The meta information extractor 212a may receive a first image 302 and generate and output AI metadata. The first image 302 may correspond to a high-quality original image that has not yet been encoded. The first image 302 may be a high-resolution image of original resolution that has not yet been down-scaled.

The meta information extractor 212a may receive the first image 302 and perform image feature analysis processing 312. The image feature analysis processing 312 may generate image feature information from the first image 302 and a plurality of segmentation probability maps. The image feature information may include class information indicating a type of a class included in the first image 302. The image feature analysis processing 312 includes generating the image feature information from the first image 302 by using various types of image feature analysis algorithms. According to an embodiment of the disclosure, the image feature analysis processing 312 may include generating class information by extracting a main class included in the first image 302 from the plurality of segmentation probability maps generated in an information generation network 316. The image feature analysis processing 312 may use (e.g., fast) Fourier transformation, Wavelet transformation, etc., that may analyze frequency information, as the image feature analysis algorithms. The image feature analysis processing 312 may a Sobel filter, a Laplacian filter, a Canny filter, etc., that may analyze edge information, as the image feature analysis algorithms. The meta information extractor 212a may use morphology erosion, dilation computation, etc., that may analyze texture information in an image, as the image feature analysis algorithms. The meta information extractor 212a may subdivide an image feature into various image features by combining a plurality of image feature analysis algorithms in the image feature analysis processing 312. For example, the meta information extractor 212a may calculate at least one or a combination of frequency information, edge information, or texture information by using the plurality of image feature analysis algorithms in the image feature analysis processing 312.

The image feature analysis processing 312 may select some of objects detected from the first image 302 and associate the objects with a certain number of classes, by using the plurality of segmentation probability maps generated in the information generation network 316. As described above, when the number of types of the detected objects is greater than a preset number, the meta information extractor 212a may extract a certain number of objects in an order of a corresponding larger region to define the certain number of classes. For example, when a total of four objects of sky, grass, plant, water, and default are detected from the first image 302 and a certain number of classes is four, the image feature analysis processing 312 may extract a certain number of objects in an order of a corresponding larger region to define sky, grass, plant, and default as classes, and not to define water as a class. According to an embodiment of the disclosure, the meta information extractor 212a may include the default class indicating a region that is not classified into a particular object in a class at all times, regardless of an area of the region.

The information generation network 316 may receive the first image 302 and generate a segmentation probability map for a plurality of predefined objects. For example, 32 objects may be predefined for the information generation network 316 that may receive the first image 302, and the information generation network 316 may generate a segmentation probability map for each of the 32 objects. The segmentation probability map may indicate a probability that each pixel or region of the first image 302 may correspond to an object corresponding to the segmentation probability map. The information generation network 316 may include or use the first AI network 114. According to an embodiment of the disclosure, the first AI network 114 may generate a plurality of segmentation probability maps from the first image 302, by using an SFTGAN algorithm.

The meta information extractor 212a may perform metadata generation processing 318 to generate AI metadata including class information and a class map. The metadata generation processing 318 may include extracting a segmentation probability map of an object included in class information generated in the image feature analysis processing 312 from the plurality of segmentation probability maps generated in the information generation network 316. The metadata generation processing 318 may output AI metadata including a plurality of class maps and class information. The meta information extractor 212a may generate AI metadata including class information and a class map, based on certain standards.

Figure 4:
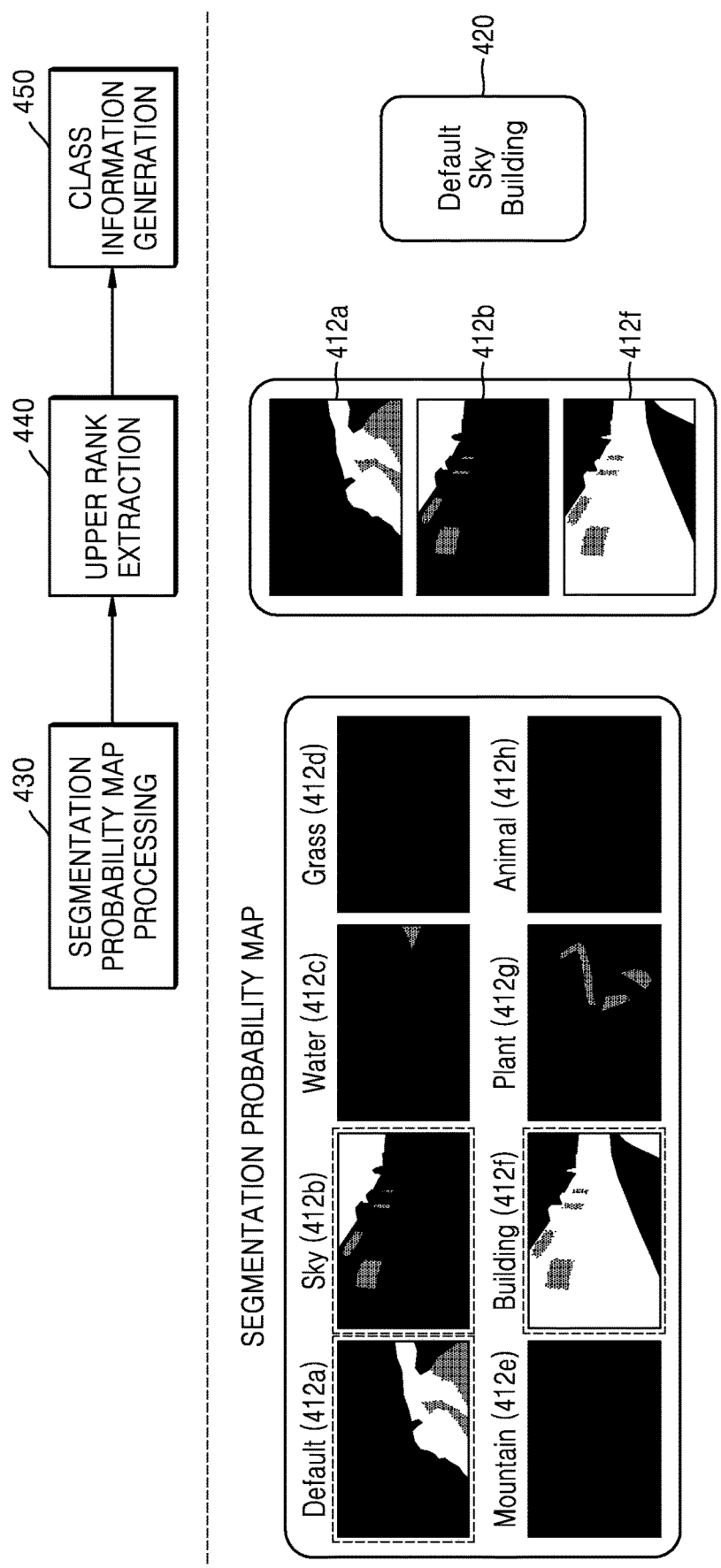
FIG. 4 illustrates a process of generating object information and class information from a first image in image feature analysis processing, according to an embodiment of the disclosure.

FIG. 4 illustrates a process of generating object information and class information from a first image in image feature analysis processing, according to an embodiment of the disclosure.

According to an embodiment of the disclosure, the meta information extractor 212a may extract information indicating a type of an object included in the first image 302 from the first image 302 as a result of the image feature analysis processing 312. The information generation network 316 may generate a plurality of segmentation probability maps 412a, 412b ..., 412h corresponding to predefined objects such as sky, water, grass, mountain, building, plant, animal, etc. In the image feature analysis processing 312, class information is generated from the plurality of segmentation probability maps 412a, 412b, ..., 412h generated from the information generation network 316.

The plurality of segmentation probability maps 412a, 412b, ..., 412h may be generated for each object, and indicate a probability of each region of the first image corresponding to the object. In the disclosure, a probability map indicating a probability of corresponding to a certain class will be referred to as a class map, and a probability map indicating a probability of corresponding to a certain object will be referred to as a segmentation probability map. The class map may define class information in the image feature analysis processing 312, and then may be defined for classes included in the class information.

According to an embodiment of the disclosure, the plurality of segmentation probability maps 412a, 412b, ..., 412h may indicate a probability of corresponding to each object type in each pixel or region of the first image 302. The plurality of segmentation probability maps 412a, 412b, ..., 412h may be configured as the same resolution as a resolution of the first image 302 or as a resolution less than the resolution of the first image 302.

The plurality of segmentation probability maps 412a, 412b, ..., 412h may include segmentation probability maps 412a, 412b, ..., 412h corresponding to each of at least one predefined object types. Each of the plurality of segmentation probability maps 412a, 412b, ..., 412h may include information of whether each pixel or region of the first image 302 corresponds to an object type or information indicating a probability of the pixel corresponding to the object type. For example, the segmentation probability map 412b corresponding to sky may have a value of 1 in a region of the first image 302 corresponding to sky and may have a value of 0 in a region of the first image 302 not corresponding to sky. In another example, each pixel of the segmentation probability maps 412a, 412b, ..., 412h may have a positive real number indicating a probability. The segmentation probability map 412a corresponding to a default value may be calculated, which may indicate a region that does not correspond to any of predefined object types. According to an embodiment of the disclosure, each pixel value of each of the plurality of segmentation probability maps 412a, 412b, 412h may be set for each pixel such that a sum of pixel values of each of the plurality of segmentation probability maps 412a, 412b, ..., 412h is 1.

The meta information extractor 212a may derive n upper classes from the plurality of segmentation probability maps 412a, 412b, ..., 412h based on average values of the segmentation probability maps 412a, 412b, ..., 412h to determine a class to be included in class information. The image feature analysis processing 312 may be performed through segmentation probability map processing 430, upper rank extraction 440, and class information generation 450.

The segmentation probability map processing 430 may calculate an average value of non-zero pixel values for each of the plurality of segmentation probability maps 412a, 412b, ..., 412h, and remove a pixel value of a pixel that is less than an average value from a class. For example, when an average value of non-zero pixel values in the segmentation probability map 412b for the sky object is 0.4, a pixel value less than 0.4 may be removed from the segmentation probability map 412b. Such processing may prevent erroneous classification of pixels.

Next, the upper rank extraction 440 may determine the segmentation probability maps 412a, 412b, and 412f having k upper pixel values based on the average value of the segmentation probability maps 412a, 412b, ..., 412h, and k may indicate the number of classes and may be a predefined natural number. When an average value of the segmentation probability maps 412a, 412b, ..., 412h is high, an area occupied by an object in the first image 320 may be large. The image feature analysis processing 312 may extract n upper-rank objects and define the n upper-rank objects as classes, thus accurately extracting a type of an object occupying a large area in the first image 320. The segmentation probability maps 412a, 412b, and 412f selected as upper ranks merely correspond to an embodiment of the disclosure, and upper-rank segmentation probability maps may be determined variously in each embodiment of the disclosure.

Next, the class information generation processing 450 may define objects corresponding to the upper-rank segmentation probability maps 412a, 412b, and 412f as classes and generate class information 420. The class information 420 may indicate a plurality of classes selected as upper ranks. The class information 420 may include, for example, default, sky, and building in an example of FIG. 4, as information regarding classes corresponding to average values of the segmentation probability maps 412a, 412b, and 412f, in which the average values are k upper values.

According to an embodiment of the disclosure, the meta information extractor 212a may map an object, which is not selected as a class, to one of selected objects, i.e., classes among objects corresponding to non-zero detected values of the segmentation probability maps 412a, 412b, ..., 412h. For example, an object corresponding to plant (corresponding to the segmentation probability map 412g) is not selected as one of upper three objects, but may be mapped to a class corresponding to sky among defined classes and transmitted. Types of objects mapped to each other may be predefined. Among predefined object types, in actual application to an AI network, object types reconstructing details may be similarly predefined as objects mapped to each other. For example, human hair and animal fur may be defined as similar objects mapped to each other. The meta information extractor 212a may perform mapping between objects by using information about objects mapped to each other, and the mappings may be stored in the memory 116, etc. According to an embodiment of the disclosure, when an object to be mapped to a certain object is undefined, the certain object may be mapped to an object corresponding to the default class.

The image feature analysis processing 312 may perform object mapping processing to generate a class map combining the plurality of segmentation probability maps 412a, 412b, ..., 412h. For example, the image feature analysis processing 312 may generate a class map by combining the segmentation probability maps 412a, 412b, and 412f of objects selected as classes with at least one of the segmentation probability maps 412c, 412d, 412e, 412g, and 412h of objects that are not selected as classes. The segmentation probability maps 412a, 412b, ... 412h may be combined using averaging or weighted averaging with respect to pixel values. When mapping processing is performed on the segmentation probability maps 412a, 412b, ..., 412h, the metadata generation processing 318 may receive the class map generated by mapping processing from the image feature analysis processing 312. The metadata generation processing 318 may generate AI metadata by receiving the class information and the class map from the image feature analysis processing 312. In another example, the image feature analysis processing 312 may determine objects to be mapped to each other and transmit information about inter-object mapping to the metadata generation processing 318. The metadata generation processing 318 may generate a class map from a segmentation probability map generated in the information generation network 316, based on the information about inter-object mapping. In the metadata generation processing 138, the segmentation probability maps 412a, 412b, . . . 412h may be combined using averaging or weighted averaging with respect to pixel values.

Figure 5:
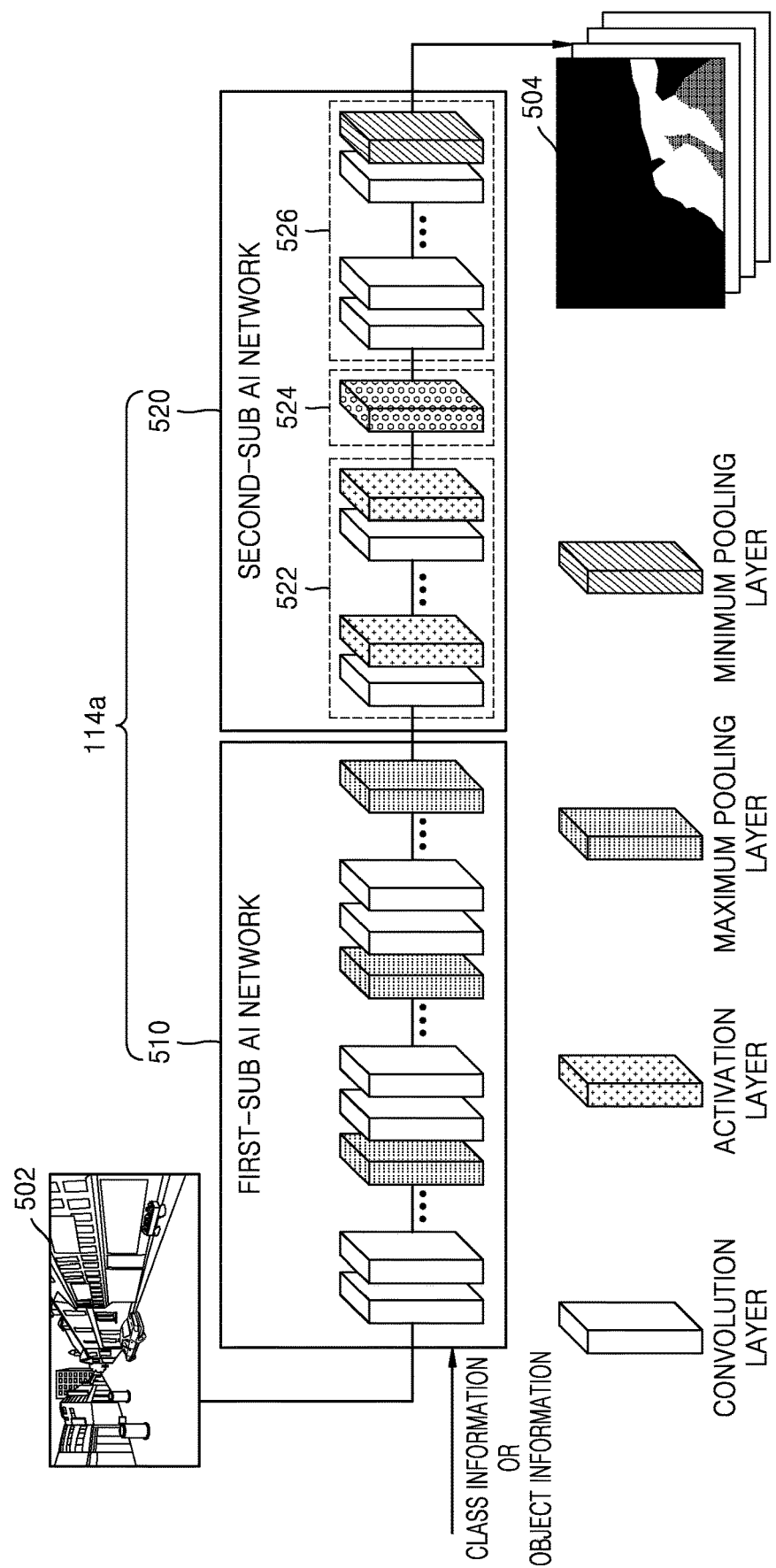
FIG. 5 illustrates an operation of an information generation network of a meta information extractor, according to an embodiment of the disclosure.

FIG. 5 illustrates an operation of an information generation network of a meta information extractor according to an embodiment of the disclosure.

The information generation network 316 may receive the first image 502 and generate a segmentation probability map 504 for a plurality of predefined objects. The plurality of objects may be predefined in a designing process of the information generation network 316. For example, 32 objects may be predefined for the information generation network 316 that may receive the first image 302 and generate a segmentation probability map 504 for each of the 32 objects. The information generation network 316 may be trained to generate the segmentation probability map 504 for preconfigured objects. The information generation network 316 may include a plurality of operation layers and perform processing through the plurality of operation layers based on a parameter value generated through training with multiple training data.

According to an embodiment of the disclosure, the information generation network 316 may be configured to generate the segmentation probability map 504 based on other image feature information such as a frequency feature, a texture feature, etc., as well as an object. For example, the information generation network 316 may generate and output the segmentation probability map 504 for each of a plurality of preconfigured frequency domains.

The information generation network 316 may include a first AI network 114a including a plurality of layers. The first AI network 114a may include a first-sub AI network 510 and a second-sub AI network 520. The first AI network 114a may have, for example, a CNN architecture. In the disclosure, the first-sub AI network 510 and the second-sub AI network 520 may refer to groupings of a plurality of layers of the first AI network 114a, and may not mean that the first AI network 114a is implemented separately as the first-sub network 510 and the second-sub AI network 520. The first AI network 114a may be configured variously including a plurality of layers, and may include one or a plurality of layer groups.

The first-sub AI network 510 may generate a feature map from the first image 502. The feature map may be data obtained by extracting certain implied information from the first image 502.

The first-sub AI network 510 may include a plurality of layers, and may be configured as a single forward pass architecture. According to an embodiment of the disclosure, the first-sub AI network 510 may include a combination of at least one convolution layer and at least one maximum pooling layer. For example, the first-sub AI network 510 may have an architecture in which a certain number of convolution layers and maximum pooling layers are repeatedly arranged. The first image 502 and the class information input to the first-sub AI network 510 may be sequentially processed and transmitted through a plurality of layers.

The first-sub AI network 510 may generate a feature map by processing the first image into a plurality of convolution layers. The first-sub AI network 510 may repeatedly perform processing including processing middle data, which is a result of processing input data through a certain number of convolution layers, by using maximum pooling layers to extract a main feature value from the middle data. The first-sub AI network 510 may generate a down-scaled feature map from the first image 502. The feature map output from the first-sub AI network 510 may be input to the second-sub AI network 520.

The convolution layer may perform convolution processing with respect to input data by using certain filter kernel. Through the filter kernel, a certain feature may be extracted from the input data. For example, the convolution layer may perform a convolution operation with respect to the input data by using a filter kernel of a size of 3*3. The convolution layer may determine pixel values of a feature map through multiplication and addition between parameters of the filter kernel and corresponding pixel values in the input data. The parameters of the filter kernel and parameters of the convolution operation may be previously determined by training. The convolution layer may additionally perform padding to generate output data of the same size as input data.

The maximum (Max) pooling layer may apply a certain filter to input data to extract and output a maximum value among the input data in the filter. For example, the maximum pooling layer may extract and output a maximum value in a 2*2 filter while moving the 2*2 filter with respect to the input data. The maximum pooling layer may reduce a size of input data by a rate of a filter size by applying a filter in a block unit corresponding to the filter size with respect to the input data. For example, the maximum pooling layer using the 2*2 filter may reduce a width and a length of the input data to ½, respectively. The maximum pooling layer may be used to transmit a main value of the input data to a next layer.

The second-sub AI network 520 may receive a feature map and generate the plurality of segmentation probability maps 504. The second-sub AI network 520 may include a plurality of layers, and may have a single forward pass architecture. According to an embodiment of the disclosure, the second-sub AI network 520 may include a combination of at least one convolution layer, at least one activation layer, and at least one minimum pooling layer.

The activation layer may perform processing that gives non-linearity to the input data. The activation layer may perform an operation based on, for example, a sigmoid function, a Tan h function, a rectified linear unit (ReLU) function, etc.

The minimum (Min) pooling layer may apply a certain filter to input data to extract and output a minimum value among the input data in the filter. For example, the minimum pooling layer may extract and output a minimum value in a 2*2 filter while moving the 2*2 filter with respect to the input data. The minimum pooling layer may reduce a size of input data by a rate of a filter size by applying a filter in a block unit corresponding to the filter size with respect to the input data. For example, the minimum pooling layer using the 2*2 filter may reduce a width and a length of the input data to ½, respectively.

According to an embodiment of the disclosure, the second-sub AI network 520 may include a first layer group 522, an up-scaler 524, and a second layer group 526. The first layer group 522, the up-scaler 524, and the second layer group 526 may be arranged in a single forward pass architecture.

The first layer group 522 may receive a feature map and perform non-linearity processing on the feature map. The first layer group 522 may include a combination of at least one convolution layer and at least one activation layer. For example, the first layer group 522 may have an architecture in which a convolution layer and an activation layer are arranged alternately.

The up-scaler 524 may receive an output of the first layer group 522 and perform up-scaling thereon. The up-scaler 524 may be implemented using various types of up-scaling algorithms. According to an embodiment of the disclosure, the up-scaler 524 may correspond to an AI up-scaler utilizing an artificial intelligence model having a DNN architecture.

The second layer group 526 may receive an output of the up-scaler 524 and perform additional processing thereon. The second layer group 526 may include a combination of at least one convolution layer and at least one minimum pooling layer. For example, the second layer group 526 may have an architecture in which a plurality of convolution layers are arranged and a minimum pooling layer is arranged last.

When other image features in addition to an object type are analyzed together, the first AI network 114a corresponding to each image feature may be separately provided. For example, when a class, a frequency, and a texture are analyzed as image features, the first AI network corresponding to the class, the first AI network corresponding to the frequency, and the first AI network corresponding to the texture may be provided separately.

Figure 6:
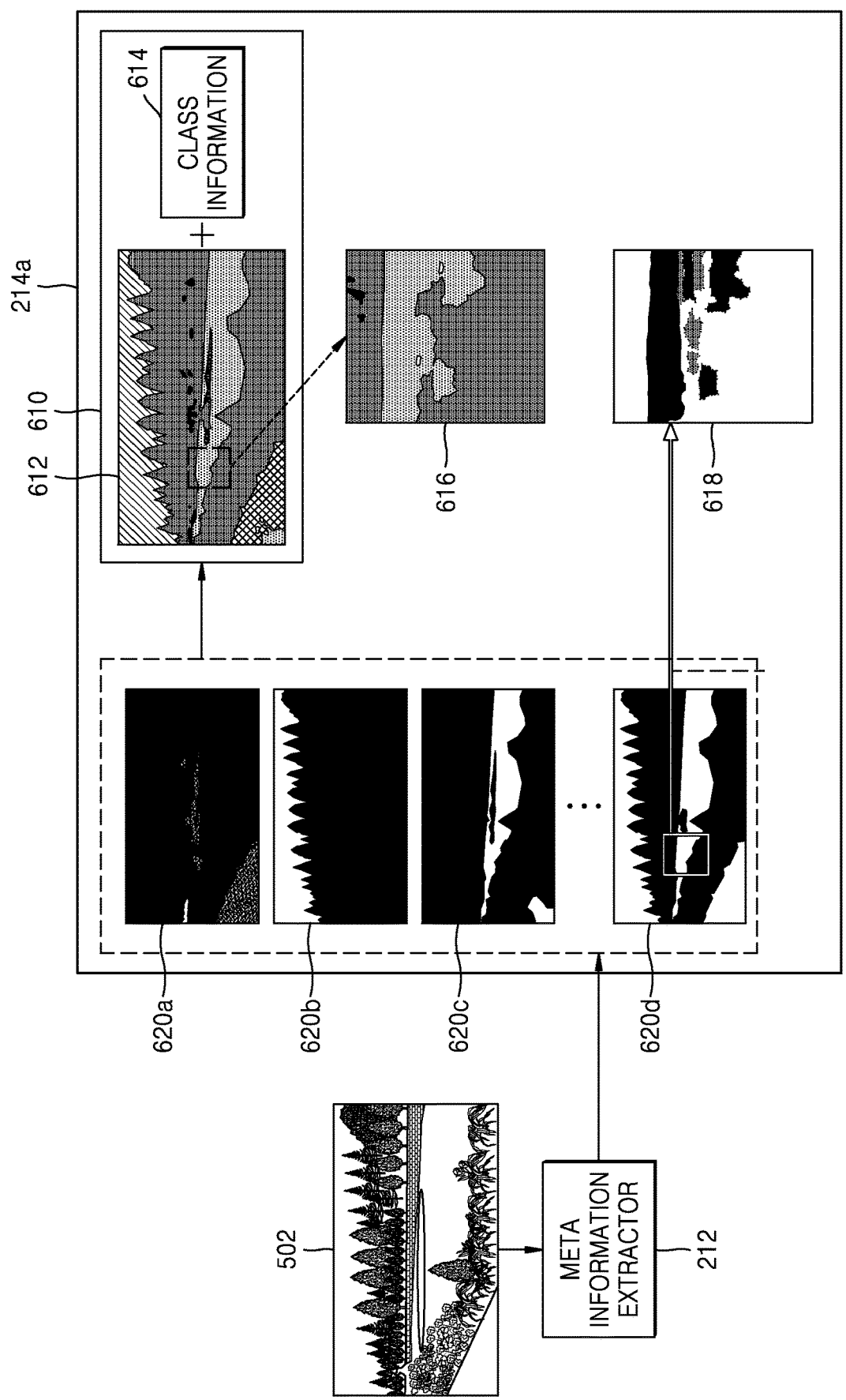
FIG. 6 illustrates an operation of a meta information lightweighter of an image providing apparatus, according to an embodiment of the disclosure.

FIG. 6 illustrates an operation of a meta information lightweighter of an image providing apparatus, according to an embodiment of the disclosure;

The metadata generator 210 of the processor 112a may include a meta information lightweighter 214a. The meta information lightweighter 214a may receive AI metadata generated in the meta information extractor 212 and perform lightweighting to reduce the quantity and/or size of the AI metadata.

The meta information lightweighter 214a may receive class information and a class map extracted from the meta information extractor 212, transform the received class information and class map into a lightweighted class map 612 having position-based representative information and class information 614 indicating a class corresponding to each representative value, and thus generate lightweighted AI metadata 610.

The meta information lightweighter 214a may generate from class information and class maps 620a, 620b, 620c, and 620d, the lightweighted class map 612 in which each pixel has a representative value of a class of a segmentation region corresponding to the pixel. The lightweighted class map 612 may be a map having representative information corresponding to each pixel. According to an embodiment of the disclosure, as indicated by 616, a color corresponding to each representative value may be defined and each pixel of the lightweighted class map 612 may have a color corresponding to a value of the pixel.

The representative value of each pixel may be determined based on a probability presented in the plurality of class maps 420. For example, the representative value of the lightweighted class map 612 may be defined as a value corresponding to a class having the highest probability in the pixel. The number of representative values of the lightweighted class map 612 may be determined based on the number of classes, k, included in the class information. Thus, the number of bits allocated to each pixel of the lightweighted class map 612 may be determined as ($\log_2$ k) based on the number of classes, k, included in the class information. The lightweighted class map 612 may be expressed as ($\log_2$ k)*w*h bits. Herein, w may indicate a width of the lightweighted class map, and h may indicate a height of the lightweighted class map. The width and height of the lightweighted class map may be equal to or less than those of the first image 602.

The meta information lightweighter 214a may generate class information 614 including a class type included in the class information generated in the meta information extractor 212 and information about a class corresponding to each representative value of the lightweighted class map 612. For example, when the selected classes are water, grass, and default, the class information 614 may include information indicating that the selected classes are water, grass, and default; a first value is allocated to water, a second value is allocated to grass, and a third value is allocated to default. The first value, the second value, and the third value may be defined as the smallest value that may be expressed with a minimum number of bits.

The meta information lightweighter 214a may output the lightweighted AI metadata 610 including the lightweighted class map 612 and the lightweighted class information 614.

When the AI metadata is not lightweighted, the plurality of class maps 620a, 620b, 620c, and 620d may include the class maps 620a, 620b, 620c, and 620d for respective classes, thus requiring k*w*h bits in one frame image. When a probability of each pixel corresponding to a class in the class maps 620a, 620b, 620c, and 620d as indicated by 618, a class map may need to be generated with a floating value to express a probability value; for a level of 32 for a floating value, 32*k*w*h bits may be required for a plurality of class maps of one frame image. On the other hand, when AI metadata is lightweighted as in the current embodiment of the disclosure, the AI metadata may be expressed with ($\log_2$ k)*w*h bits for one frame image. Thus, through lightweighting of the AI metadata, the number of bits of the AI metadata may be reduced to (($\log_2$ k)/(ck)) or an equivalent level when compared to the number of bits before lightweighting. Herein, c may indicate the number of bits allocated to one pixel of the existing class maps 620a, 620b, 620c, and 620d (in the previous example, 32 bits). Therefore, according to the current embodiment of the disclosure, the number of bits required for AI metadata may be significantly reduced.

Figure 7:
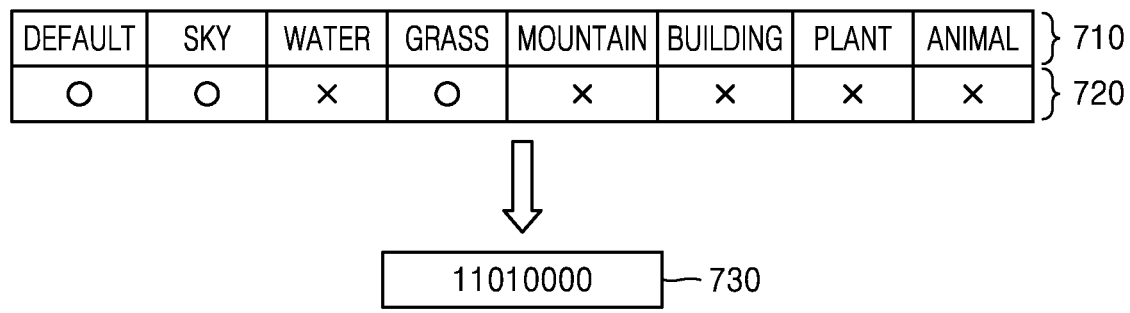
FIG. 7 illustrates an operation of a meta information compressor according to an embodiment of the disclosure.

FIG. 7 illustrates an operation of a meta information compressor according to an embodiment of the disclosure.

The meta information compressor 216 may perform compression with respect to the class information lightweighted in the meta information lightweighter 214. The meta information compressor 216 may perform compression with respect to the class information and the lightweighted class map. Compression with respect to the class information will be described with reference to FIGS. 7 and 8, and compression with respect to the lightweighted class map will be described with reference to FIG. 9.

According to an embodiment of the disclosure, class information 730 may be represented as a bit value allocated to each of predefined objects 710. For example, the class information 730 may be assigned with a bit value of 1 for the object 710 selected as a class and may be assigned with a bit value of 0 for the other objects 710 for the predefined objects 710. For example, when there are 8 predefined objects 710 for AI metadata, 8-bit class information may be defined and each object 710 may be allocated to each bit. The bit value corresponding to each object 710 may have a value of 0 or 1 according to whether the object 710 is selected as a class.

Thus, the class information of FIG. 7 may indicate the class information 730 in which the default class, the sky class, and the pool class are selected as classes.

The meta information compressor 216 may perform compression with respect to the class information 730. The meta information compressor 216 may compress the class information 730 and the class map by using a compression scheme used for symbol compression and transmit them as a bitstream. The meta information compressor 216 may compress the class information 730 and the class map by using a scheme, for example, Run-length encoding, Huffman coding, Arithmetic coding, etc.

Figure 8:
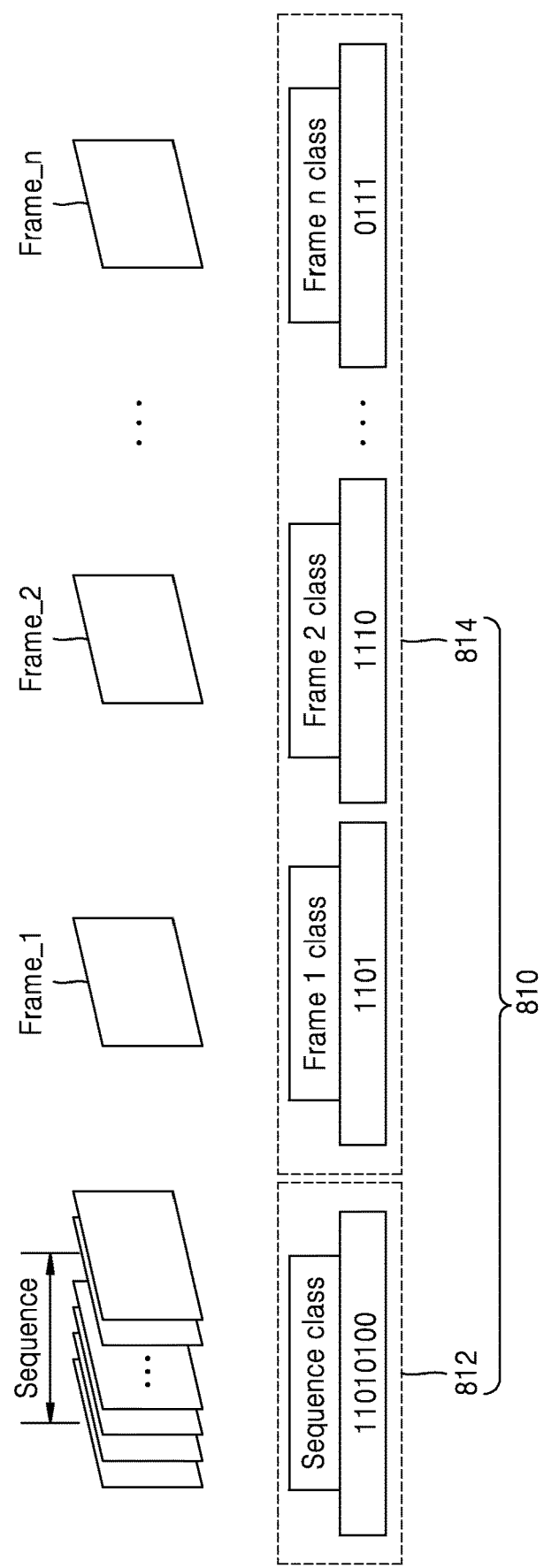
FIG. 8 illustrates a scheme to compress class information in a meta information compressor, according to an embodiment of the disclosure.

FIG. 8 illustrates a scheme to compress class information in a meta information compressor, according to an embodiment of the disclosure. In FIG. 8, as in the embodiment described with reference to FIG. 7, a description will be made of an embodiment in which one bit may be allocated to each object and class information is indicated with 1 and 0.

According to an embodiment of the disclosure, a first image may be video data including a plurality of frames, and class information may be defined for each sequence including a plurality of frames Frame_1, Frame_2, ..., Frame_n.

According to an embodiment of the disclosure, the number of frames included in a sequence may be preset.

According to another embodiment of the disclosure, the number of frames included in a sequence may be dynamically defined based on image contents of the first image. For example, the number of frames may be defined differently for a different sequence corresponding to a case in which an image feature change of a level higher than a certain criterion is detected in the first image, a case in which a scene change is detected, or the like. When a maximum number of the number of frames included in a sequence is set and the number of frames included in the sequence reaches a maximum value even though a case satisfying a criterion for a sequence change is not detected from image contents of the first image, the meta information extractor 212a may additionally define the sequence such that a frame less than or equal to the maximum value is included in each sequence.

According to another embodiment of the disclosure, a frame included in a sequence may be determined based on a candidate class detected in the frame of the sequence. The meta information extractor 212a may define a sequence such that the number of candidate classes having a detection value greater than or equal to a certain value does not exceed a certain number in the frame of the sequence. For example, when the number of predefined objects is 8, the meta information compressor 216 may define a sequence such that the number of objects having a detection value greater than or equal to a certain value does not exceed 4 in a corresponding sequence frame.

According to an embodiment of the disclosure, class information 810 may include sequence class information 812 and frame class information 814. The class information 810 may include frame class information 814 corresponding to the number of frames included in the sequence. The class information 810 may include additional information such as a range of frames, the number of frames number, etc., included in the sequence corresponding to the class information 810. According to an embodiment of the disclosure, the class information 810 may include additional information such as a length of the class information 810, a range of the sequence class information 812 and the frame class information 814 in the class information 810, etc.

The sequence class information 812 may indicate candidate classes detected from frames included in the sequence. The sequence class information 812 may include the number of bits corresponding to the predefined number of candidate classes. When the number of candidate classes selected from class information of each frame is k, the sequence class information 812 may have a value of 1 for candidate classes of a number greater than or equal to 1. For example, when the frame class information 814 is information indicating that candidate classes having upper three detection values of object detection are selected from among the candidate classes, the sequence class information 812 may have three or more 1s (e.g., four values of 1). In this case, the sequence class information 812 may mean that frames included in the sequence include objects of a predetermined number (e.g., three) of candidate classes among four candidate classes.

The frame class information 814 may correspond to information corresponding to each frame Frame_1, Frame_2, ..., Frame_n included in the sequence, and may include information about a candidate class corresponding to a detected object in each frame. The frame class information 814 may be sequentially arranged in a frame order and recorded in a bitstream.

The frame class information 814 may have a data size (bit number) corresponding to the number of bits having a value of 1 in the sequence class information 812. For example, when the number of bits having a value of 1 is 4 in the sequence class information 812, a plurality of frame class information 814 corresponding to the sequence may be defined as 4 bits. According to an embodiment of the disclosure, the number of bits of the frame class information 814 may vary with the sequence class information 812. According to another embodiment of the disclosure, the number of bits of the frame class information 814 may be preset and the sequence class information 812 may have as many values of 1 as bits corresponding to the number of bits of the frame class information 814. To this end, the sequence may be defined to have as many values of 1 as bits or less corresponding to the number of bits of the frame class information 814.

Figure 9:
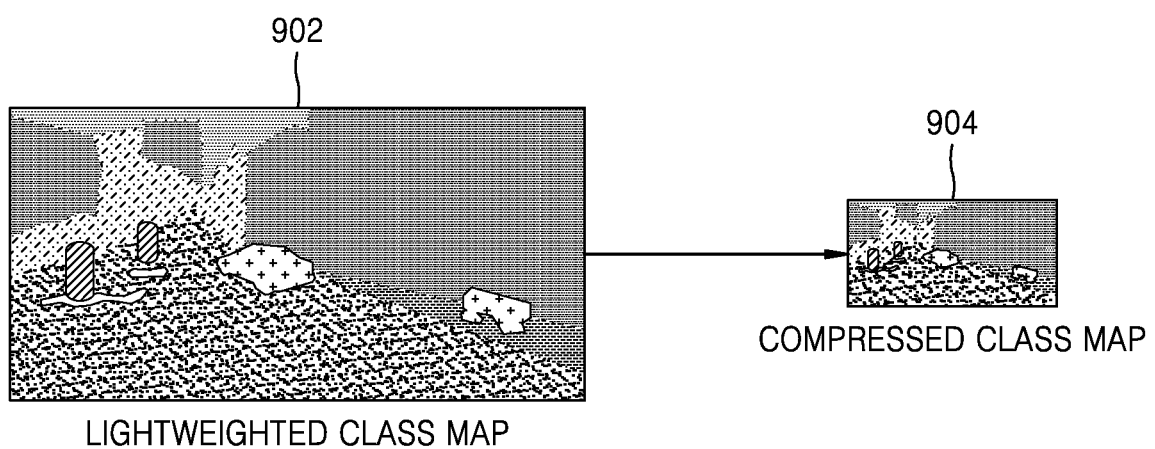
FIG. 9 illustrates an operation of a meta information compressor of an image providing apparatus, according to an embodiment of the disclosure.

FIG. 9 illustrates an operation of a meta information compressor of an image providing apparatus, according to an embodiment of the disclosure.

The meta information compressor 216 may down-scale a lightweighted class map 902 generated in the meta information lightweighter 214a to compress the lightweighted class map 902, and generate and output a compressed class map 904. Compression with respect to the lightweighted class map 902 may use lossless compression used in image compression. For example, the meta information compressor 216 may compress the lightweighted class map 902 by grouping pixel values in the lightweighted class map 902 and extracting maximum probability class information. The meta information compressor 216 may compress the lightweighted class map 902 by using a scheme, for example, Run-length encoding, Huffman coding, Arithmetic coding, etc. According to an embodiment of the disclosure, the meta information compressor 216 may compress the lightweighted class information by using a certain compression scheme. The meta information compressor 216 may generate compressed AI metadata including the compressed class information and the compressed class map 904.

According to embodiments of the disclosure, even when the lightweighted class map 902 of the AI metadata is compressed, similar details are generated without degradation of image quality in an image reproducing apparatus. According to the current embodiment of the disclosure, by reducing the size of the AI metadata without degradation in image quality, the efficiency of data storage and transmission may be improved.

Figure 10:
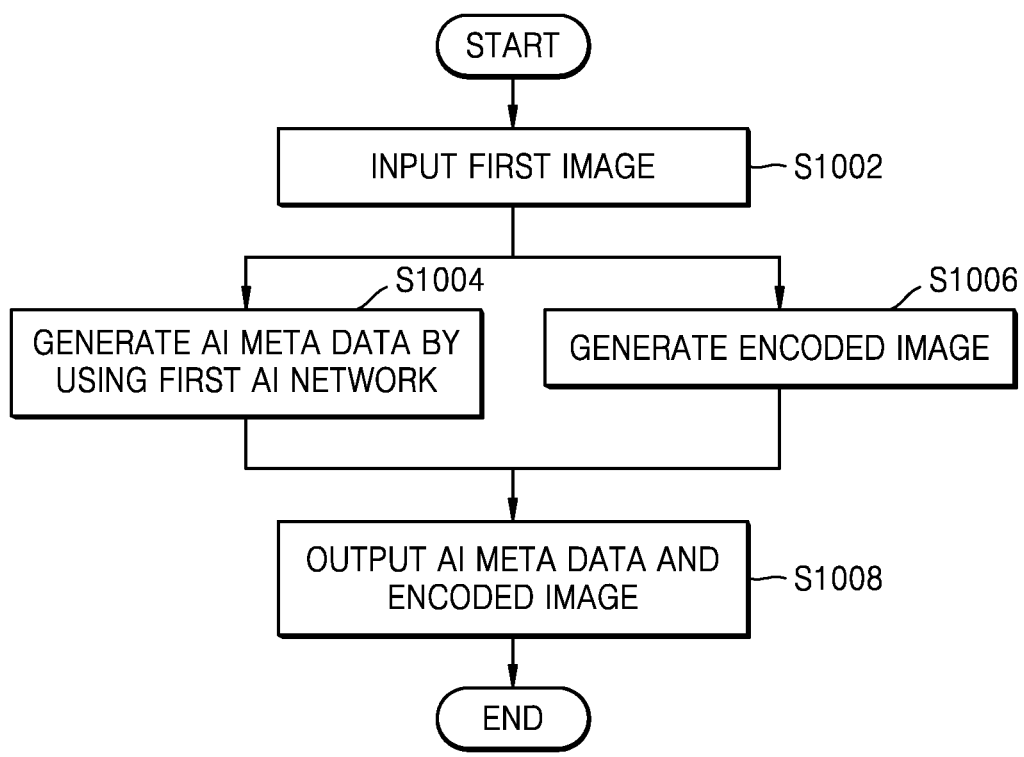
FIG. 10 is a flowchart illustrating a control method for an image providing apparatus, according to an embodiment of the disclosure.

FIG. 10 is a flowchart illustrating a control method for an image providing apparatus, according to an embodiment of the disclosure.

Operations of a control method for an image providing apparatus according to the disclosure may be performed by various forms of electronic devices including a processor, a memory, and an output interface, and using a machine-trained model. The present specification may disclose an embodiment in which the image providing apparatus 110 according to embodiments of the disclosure performs a control method for the image providing apparatus. Thus, embodiments described for the image providing apparatus 110 are applicable to embodiments for the control method for the image providing apparatus. Similarly, embodiments described for the control method for the image providing apparatus are applicable to embodiments for the image providing apparatus 110. The embodiment may not be limited to a case in which the control method for the image providing apparatus according to the disclosed embodiments of the disclosure is performed by the image providing apparatus 110 disclosed herein, and the control method may be performed by various forms of electronic devices.

The image providing apparatus may receive a first image in operation S1002.

The image providing apparatus may perform AI metadata extraction with respect to the first image to generate AI metadata in operation S1004. The image providing apparatus may perform certain image feature analysis on the first image to generate image feature information and an image feature map. The image providing apparatus may input the first image to a first AI network to generate a plurality of segmentation probability maps on predefined objects. The image providing apparatus may generate class information, which is information about an object included in the first image, from the plurality of segmentation probability maps, and generate a class map for each class defined in the class information. The image providing apparatus may generate AI metadata including the class information and the class map.

Next, the image providing apparatus may lightweight the AI metadata including the class information and the class map. The image providing apparatus may lightweight a plurality of class maps into a lightweighted class map.

Next, the image providing apparatus may generate a compressed class map by compressing the lightweighted class map. The lightweighted class information may also be further compressed. The image providing apparatus may generate and output compressed AI metadata including the compressed class information and the compressed class map. The AI metadata generation, lightweighting, and compression described for the metadata generator 210 are similarly applicable to AI metadata generation of operation S1004 and thus will not be redundantly described.

The image providing apparatus may perform encoding with respect to the first image to generate an encoded image, in operation S1006. The image providing apparatus may encode the first image by using various types of image encoding algorithms. The image providing apparatus may generate predicted data by predicting the first image, generating residual data corresponding to a difference between the first image and the predicted data, transforming the residual data, which is a spatial-domain component, into a frequency-domain component, quantizing the residual data transformed into the frequency-domain component, and entropy-encoding the quantized residual data. This encoding process may be implemented by one of image compression methods using frequency conversion, such as MPEG-2, H.264 AVC, MPEG-4, H.265/HEVC, VC-1, VP8, VP9, AV1, etc.

Next, the image providing apparatus may output the compressed AI metadata and the encoded image in operation S1008. The image providing apparatus may output the compressed AI metadata and the encoded image through various types of output interfaces such as a communication interface, a display, a speaker, a touch screen, etc.

Figure 11:
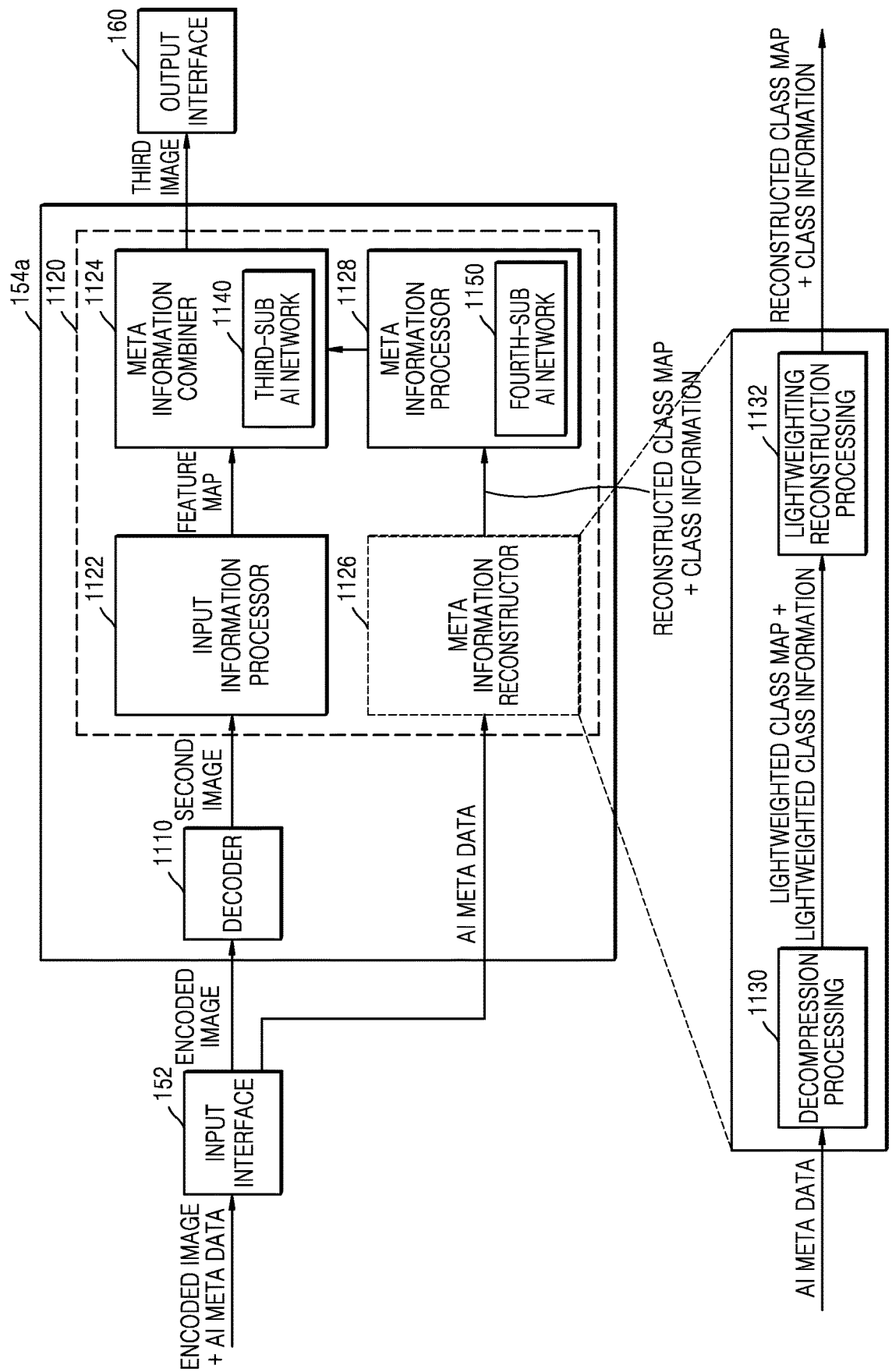
FIG. 11 is a diagram illustrating a structure of an input interface, a processor, and an output interface of an image reproducing apparatus, according to an embodiment of the disclosure.

FIG. 11 is a diagram illustrating a structure of an input interface, a processor, and an output interface of an image reproducing apparatus, according to an embodiment of the disclosure.

An image reproducing apparatus 150 may receive an encoded image and compressed AI metadata through the input interface 152. The encoded image and the compressed AI metadata may correspond to the encoded image and the compressed AI metadata generated by the image providing apparatus 110. The input interface 152 may output the encoded image to a decoder 1110 and output the compressed AI metadata to an image quality processor 1120.

The inputter 152 may correspond to a communicator, an input/output interface, etc., that receives the encoded image and the compressed AI metadata from an external device.

A processor 154a may include the decoder 1110 and an image quality processor 1120.

The decoder 1110 may perform decoding on the encoded image to generate a decoded second image. The decoder 1110 may decode the encoded image by using a decoding method corresponding to an image encoding algorithm applied to the encoded image. Information about the image encoding algorithm applied to the encoded image may be obtained from a header of the encoded image or additional information input together with the encoded image, etc. The encoded image may be decoded using a method corresponding to an encoding method used in the encoder 220 of the image providing apparatus 110. The decoder 1110 may perform entropy-decoding on image data to generate quantized residual data, dequantize the quantized residual data, generate prediction data, and reconstruct a second image by using the prediction data and the residual data. This decoding process may be implemented using an image reconstruction method corresponding to one of image compression methods using frequency conversion, such as MPEG-2, H.264 AVC, MPEG-4, H.265/HEVC, VC-1, VP8, VP9, AV1, etc., used in image encoding.

The image quality processor 1120 may receive the decoded second image and the compressed AI metadata and perform image-quality enhancement processing to generate and output a third image. The image-quality enhancement processing may include existing various types of image quality processing with respect to the decoded second image and image quality processing using AI metadata according to embodiments of the disclosure. The image quality processor 1120 may include an input information processor 1122, a meta information combiner 1124, a meta information reconstructor 1126, and a meta information processor 1128.

The AI metadata input through the input interface 152 may be input to the meta information reconstructor 1126. The meta information reconstructor 1126 may receive the compressed AI metadata input from the image providing apparatus 110 and perform decompression processing 1130 and lightweighting reconstruction processing 1132 to reconstruct the compressed AI metadata into a plurality of class maps and class information. The plurality of class maps and the class information may correspond to class maps and class information output from the meta information extractor 212 of the image providing apparatus 110.

The meta information reconstructor 1126 may perform decompression processing 1130 on the AI metadata that has been lightweighted by the meta information lightweighter 214 and compressed by the meta information compressor 216, thereby generating a lightweighted class map and lightweighted class information. The decompression processing 1130 may be performed by decoding corresponding to the encoding algorithm used in the meta information compressor 216 of the image providing apparatus 110. The lightweighted class map and the lightweighted class information generated by the decompression processing 1130 may correspond to the sequence class information 812 and the frame class information 814 generated by the meta information lightweighter 214a of the image providing apparatus 110.

The meta information reconstructor 1126 may perform lightweighted reconstruction 1132 to generate a plurality of reconstructed class maps and class information from the lightweighted class map and the lightweighted class information. The lightweighting reconstruction processing 1132 may generate a plurality of reconstructed class maps corresponding to respective classes by using a representative value of the lightweighted class map. The lightweighting reconstruction processing 1132 may generate a reconstructed class map corresponding to each class based on information about a class corresponding to each representative value recorded in the lightweighted class information. For example, the lightweighting reconstruction processing 1132 may obtain information indicating that a first representative value corresponds to a water class from the lightweighted class information, and extract a region corresponding to the first representative value from the lightweighted class map, thereby generating a reconstructed class map corresponding to the water class. In this way, the lightweighting reconstruction processing 1132 may generate the reconstructed class map corresponding to each representative value to generate a plurality of reconstructed class maps corresponding to respective classes recorded in the lightweighted class information. In addition, through the lightweighting reconstruction processing 1132, class information is generated in which information corresponding to a class corresponding to a plurality of class maps is recorded. The plurality of reconstructed class maps generated by the lightweighting reconstruction processing 1132 may include information indicating whether each pixel corresponds to a class in which information about a probability is removed from a class map generated by the meta information extractor 212 of the image providing apparatus. Thus, the reconstructed class map may have a smaller size than the class map generated in the meta information extractor 212 of the image providing apparatus. The class information generated by the lightweighting reconstruction processing 1132 may correspond to class information generated by the meta information extractor 212.

The meta information processor 1128 may generate a modulation parameter for image quality processing from the AI metadata reconstructed by the meta information reconstructor 1126, i.e., the plurality of reconstructed class maps and the class information. The meta information processor 1128 may include a fourth-sub AI network 1150 that generates a modulation parameter from the plurality of reconstructed class maps and the class information. The modulation parameter may be a parameter applied to a modulation layer of a third-sub AI network 1140 of the meta information combiner 1124. The third-sub AI network 1140 may include a plurality of modulation layers. The fourth-sub AI network 1150 of the meta information processor 1128 may generate a modulation parameter for each of the plurality of modulation layers included in the third-sub AI network 1140. The AI metadata may include the plurality of reconstructed class maps and the class information corresponding to each frame, and the fourth-sub AI network 1150 of the meta information processor 1128 may generate the modulation parameter corresponding to each frame.

The input information processor 1122 may process the second image decoded by the decoder 1110 into a form required by the meta information combiner 1124 and input the same to the meta information combiner 1124. According to an embodiment of the disclosure, the input information processor 1122 may generate a feature map and output the same to the meta information combiner 1124. According to an embodiment of the disclosure, the input information processor 1122 may include a combination of at least one convolution layer and at least one activation layer to generate the feature map.

The meta information combiner 1124 may receive the feature map output from the input information processor 1122 and the modulation parameter generated by the meta information processor 1128, and perform image-quality enhancement with respect to the second image to generate and output a third image. The meta information combiner 1124 may perform image-quality enhancement on the second image by using the third-sub AI network 1140.

The meta information combiner 1124 may receive the feature map from the input information processor 1122 and perform image quality processing based on the AI metadata. The meta information combiner 1124 may include the third-sub AI network 1140 that performs meta information combining processing. The meta information combiner 1124 may apply the modulation parameter input from the meta information processor 1128 to the plurality of modulation layers included in the third-sub AI network 1140, thus performing image quality processing on the second image. According to an embodiment of the disclosure, modulation by the third-sub AI network 1140 may be performed using Affine transformation based on the modulation parameter.

The output interface 160 may receive and output the third image generated from the meta information combiner 1124. According to an embodiment of the disclosure, the output interface 160 may correspond to a display that displays the third image. According to another embodiment of the disclosure, the output interface 160 may correspond to a communicator that transmits the third image to an external device.

Figure 12:
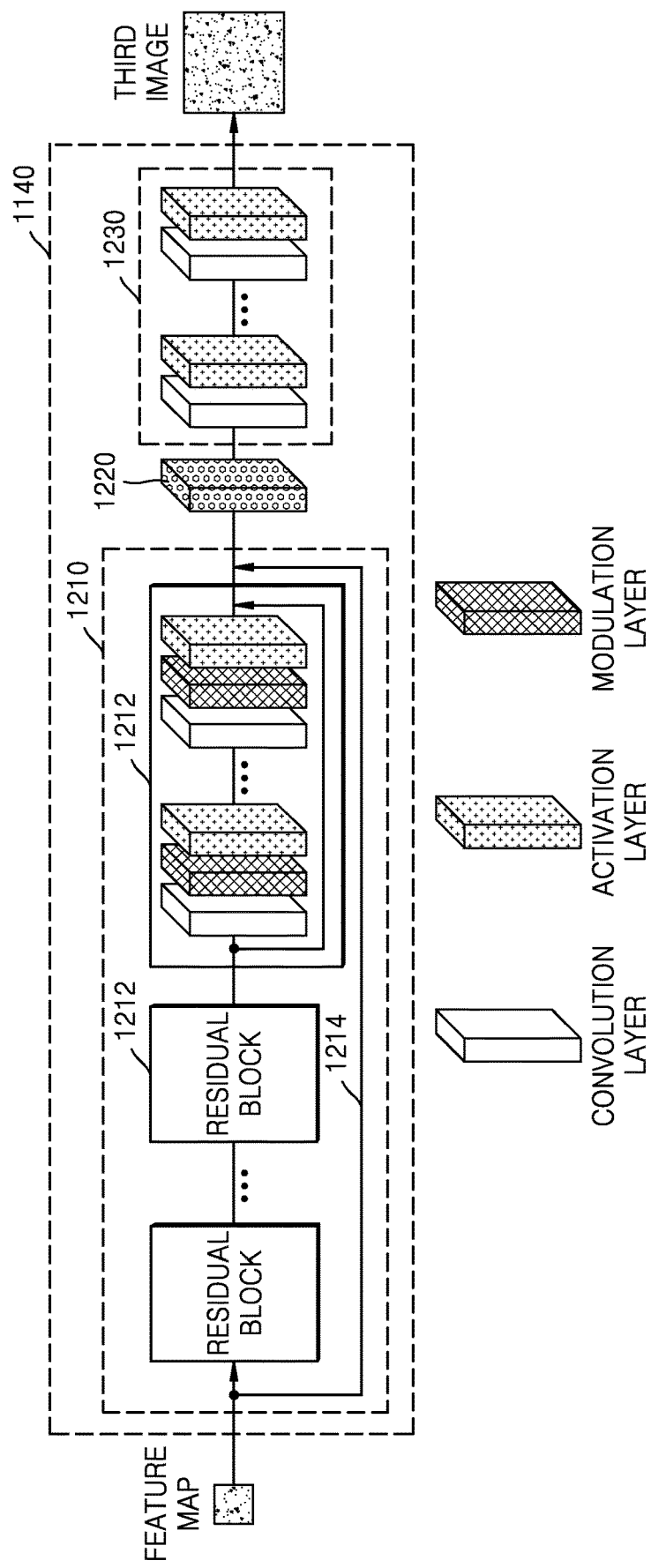
FIG. 12 illustrates an operation of a meta information combiner according to an embodiment of the disclosure.

FIG. 12 illustrates an operation of a meta information combiner according to an embodiment of the disclosure.

The meta information combiner 1124 may include the third-sub AI network 1140 including at least one layer. According to an embodiment of the disclosure, the third-sub AI network 1140 may include a combination of at least one convolution layer and at least one modulation pooling layer. The third-sub AI network 1140 may further include a plurality of activation layers. The third-sub AI network 1140 may include an up-scaler 1220 that receives the feature map generated from a low-resolution second image and up-scales a resolution of the input data.

The third-sub AI network 1140 may include a first image-quality processor 1210 including at least one residual block 1212, the up-scaler 1220, and a second image-quality processor 1230.

Herein, the first image may correspond to a high-resolution original image, the second image may correspond to a down-scaled low-resolution image, and the third image may correspond to a super-resolution image up-scaled by reconstruction of the image reproducing apparatus 150.

The first image-quality processor 1210 may include a plurality of residual blocks 1212. The first image-quality processor 1210 may receive a feature vector and perform image-quality enhancement. The first image-quality processor 1210 may include a first skip processing path 1214 that skips the plurality of residual blocks 1212. The first skip processing path 1214 may deliver input data or may perform certain processing on the input data and then deliver a processing result. The first image-quality processor 1210 may generate a residual-version processing result value by using the plurality of residual blocks 1212, and generate a prediction-version processing result value through the first skip processing path 1214. The first image-quality processor 1210 may sum the residual-version processing result value and the prediction-version processing result value and output a summing result as a processing result value thereof.

According to an embodiment of the disclosure, a start point and an end point of the first skip processing path 1214 may be determined such that the first skip processing path 1214 skips all of the plurality of residual blocks 1212. The start point and the end point of the first skip processing path 1214 may be determined differently depending on an embodiment of the disclosure. The number of first skip processing paths 1214 may be variously determined, and the first image-quality processor 1210 may include one or more first skip processing paths 1214.

Figure 13:
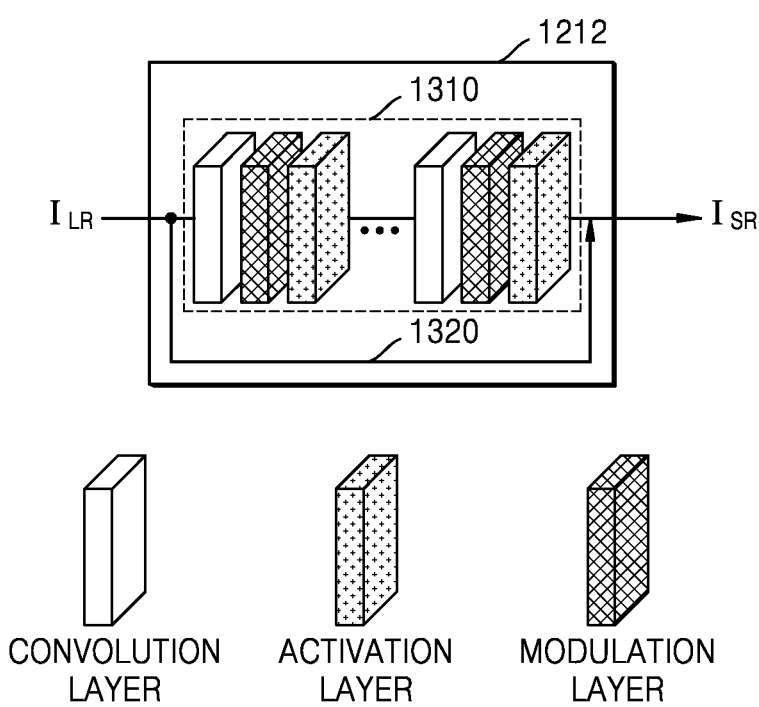
FIG. 13 illustrates a structure of a residual block according to an embodiment of the disclosure.

Referring to FIG. 13, a structure of the residual block 1212 will be described.

FIG. 13 illustrates the structure of the residual block 1212 according to an embodiment of the disclosure.

The residual block 1212 may receive and process a feature map. The residual block 1212 may include a combination of at least one convolution layer and at least one modulation layer. According to an embodiment of the disclosure, the residual block 1212 may further include at least one activation layer. According to an embodiment of the disclosure, the residual block 1212 may have a structure in which a convolution layer, a modulation layer, and an activation layer are arranged repeatedly in that order.

The residual block 1212 may include a second skip processing path 1320 that bypasses a main stream 1310 including a plurality of layers and runs from an input terminal to an output terminal. The main stream 1310 may generate the residual-version processing result value for input data, and the second skip processing path 1320 may generate the prediction-version processing result value. The residual block 1212 may sum the residual-version processing result value and the prediction-version processing result value and output a summing result as a processing result value thereof.

According to an embodiment of the disclosure, a start point and an end point of the second skip processing path 1320 may be determined such that the second skip processing path 1320 skips all of the plurality of layers in the residual block 1212. The start point and the end point of the second skip processing path 1320 may be differently determined depending on an embodiment of the disclosure. The number of second skip processing paths 1320 may be variously determined, and the residual block 1212 may include one or more second skip processing paths 1320.

According to the current embodiment of the disclosure, with the structure including the main stream 1310 and the second skip processing structure 1320, the main stream 1310 including the plurality of layers may learn a difference between the super-resolution image corresponding to the output of the third-sub AI network 1140 and the low-resolution image corresponding to the input of the third-sub AI network 1140 and deliver the other information through the second skip processing path 1320, thereby improving the efficiency of learning of details. Herein, residual data $F_{mian\text{-}stream}(I_{LR})$ used in training of the main stream 1310 may be a differential image between a super-resolution image $I_{SR}$ and a low-resolution image $I_{LR}$, and may be defined as below.

$$F_{mian\text{-}stream}(I_{LR}) = I_{SR} - I_{LR} \quad \text{[Equation 2]}$$

A modulation layer may perform modulation on input data. The modulation layer may perform Affine transformation on the input data. For each of a plurality of modulation layers included in the first image-quality processor 1210, a separate modulation parameter may be defined. The meta information processor 1128 may individually generate a modulation parameter for each of the plurality of modulation layers included in the first image-quality processor 1210 and output the generated modulation parameter to the meta information combiner 1124. To this end, the fourth-sub AI network 1150 of the meta information processor 1128 may separately include a network corresponding to each modulation layer.

Referring back to FIG. 12, a processing result of the first image-quality processor 1210 may be input to the up-scaler 1220. The up-scaler 1220 may perform up-scaling on a processing result of the first image-quality processor 1210. When a feature map of a high-resolution second image is input to the third-sub AI network 1140 after up-scaling is performed on the second image before the third-sub AI network 1140, the up-scaler 1220 may be omitted in the third-sub AI network 1140. The up-scaler 1220 may be implemented using various up-scaling algorithms, and may be implemented with an AI network having a DNN architecture.

The second image-quality processor 1230 may perform additional image-quality processing on the output of the up-scaler 1220 to generate and output a third image. When the up-scaler 1220 is omitted from the third-sub AI network 1140, the second image-quality processor 1230 may perform additional image-quality processing on a processing result value of the first image-quality processor 1210. The second image-quality processor 1230 may include a combination of at least one convolution layer and at least one activation layer.

Figure 14:
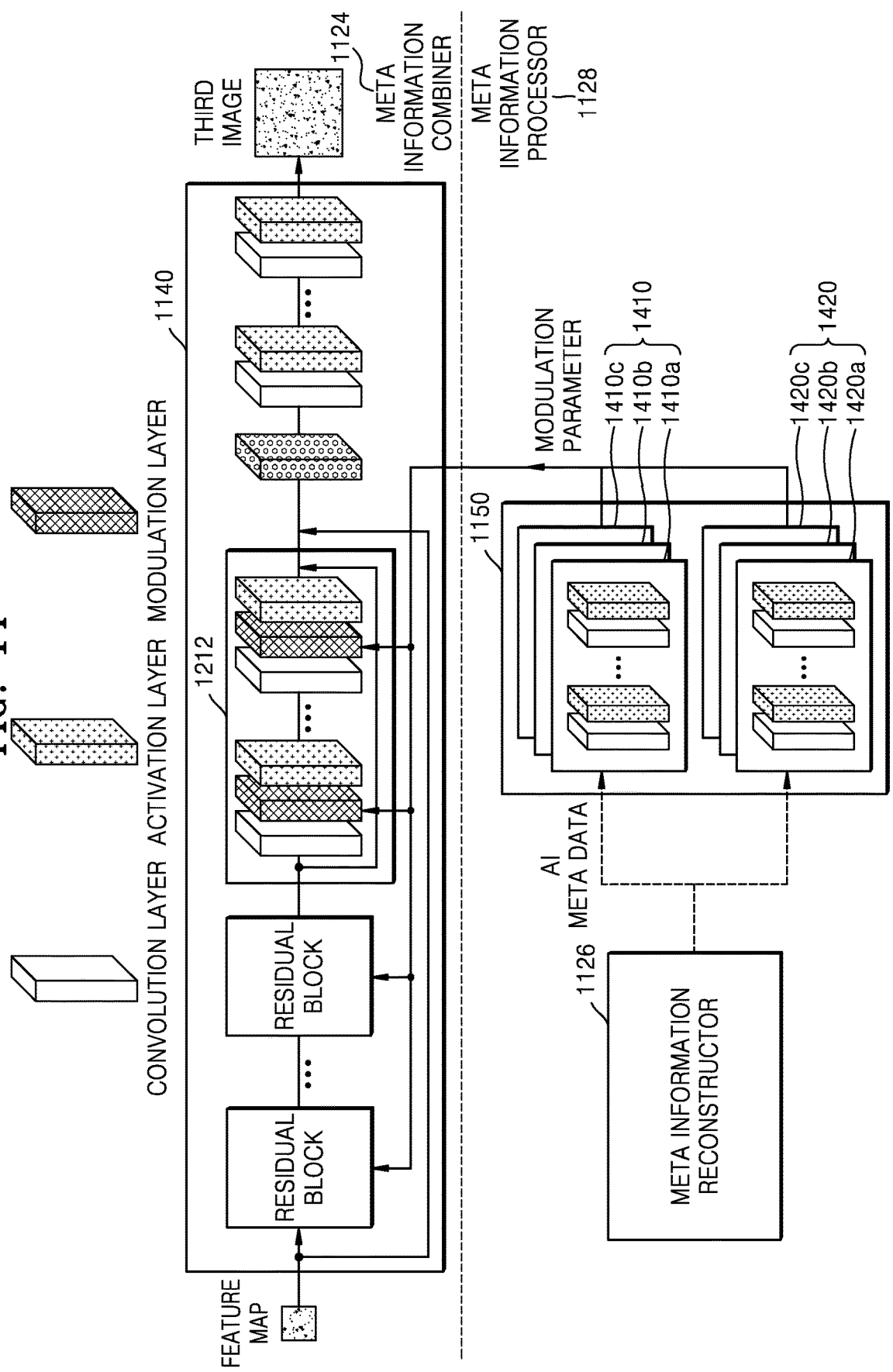
FIG. 14 illustrates an operation of a first-sub AI network and a second-sub AI network, according to an embodiment of the disclosure.

FIG. 14 illustrates an operation of a third-sub AI network and a fourth-sub AI network according to an embodiment of the disclosure.

According to an embodiment of the disclosure, the meta information processor 1128 may generate a modulation parameter from the AI metadata received and reconstructed from the image providing apparatus 110 and output the generated modulation parameter to the third-sub AI network 1140 of the meta information combiner 1124. The meta information processor 1128 may include the fourth-sub AI network 1150 or use the fourth-sub AI network 1150 provided in an external device.

The fourth-sub AI network 1150 may include a combination of at least one convolution layer and at least one activation layer. The modulation parameter may include a plurality of modulation parameter sets, and the fourth-sub AI network 1150 may include separate AI networks 1410 and 1420 for each of the plurality of modulation parameter sets.

For one modulation layer, a modulation parameter set including a plurality of parameters may be output, and the fourth-sub AI network 1150 may generate and output a plurality of modulation parameter sets for a plurality of modulation layers. The fourth-sub AI network 1150 may generate and output a first modulation parameter set for a first modulation layer and generate and output a second modulation parameter set for a second modulation layer. The fourth-sub AI network 1150 may include AI networks 1410*a* and 1420*a* corresponding to a first modulation layer, AI networks 1410*b* and 1420*b* corresponding to a second modulation layer, and AI networks 1410*c* and 1420*c* corresponding to a third modulation layer. As the quantity of modulation layers increases, the number of AI networks 1410 and 1420 in the fourth-sub AI network 1140 may increase. According to an embodiment of the disclosure, the modulation parameter set may include a first modulation parameter and a second modulation parameter, and the fourth-sub AI network 1150 may include a first modulation parameter generator 1410 and a second modulation parameter generator 1420. The first modulation parameter generator 1410 and the second modulation parameter generator 1420 may be configured to share some layers thereof with each other or may be configured separately without sharing layers.

The fourth-sub AI network 1150 may generate a plurality of modulation parameter sets and output the plurality of modulation parameter sets to the third-sub AI network 1140. The third-sub AI network 1140 may configure a modulation parameter set of each of at least one modulation layer by using the plurality of modulation parameters input from the fourth-sub AI network 1150. The modulation layer of the third-sub AI network 1140 may perform modulation on the input data based on the configured modulation parameter set.

The plurality of modulation parameter sets output from the fourth-sub AI network 1150 may be recorded in the form of a vector or tensor of a certain dimension. For example, the fourth-sub AI network 1150 may output the plurality of modulation parameter sets to the third-sub AI network 1140 through 64 channels, each of which may correspond to each element of a vector corresponding to the plurality of modulation parameter sets. The number of channels of the fourth-sub AI network 1150 may be determined according to the number of elements included in the plurality of modulation parameter sets.

Figure 15A:
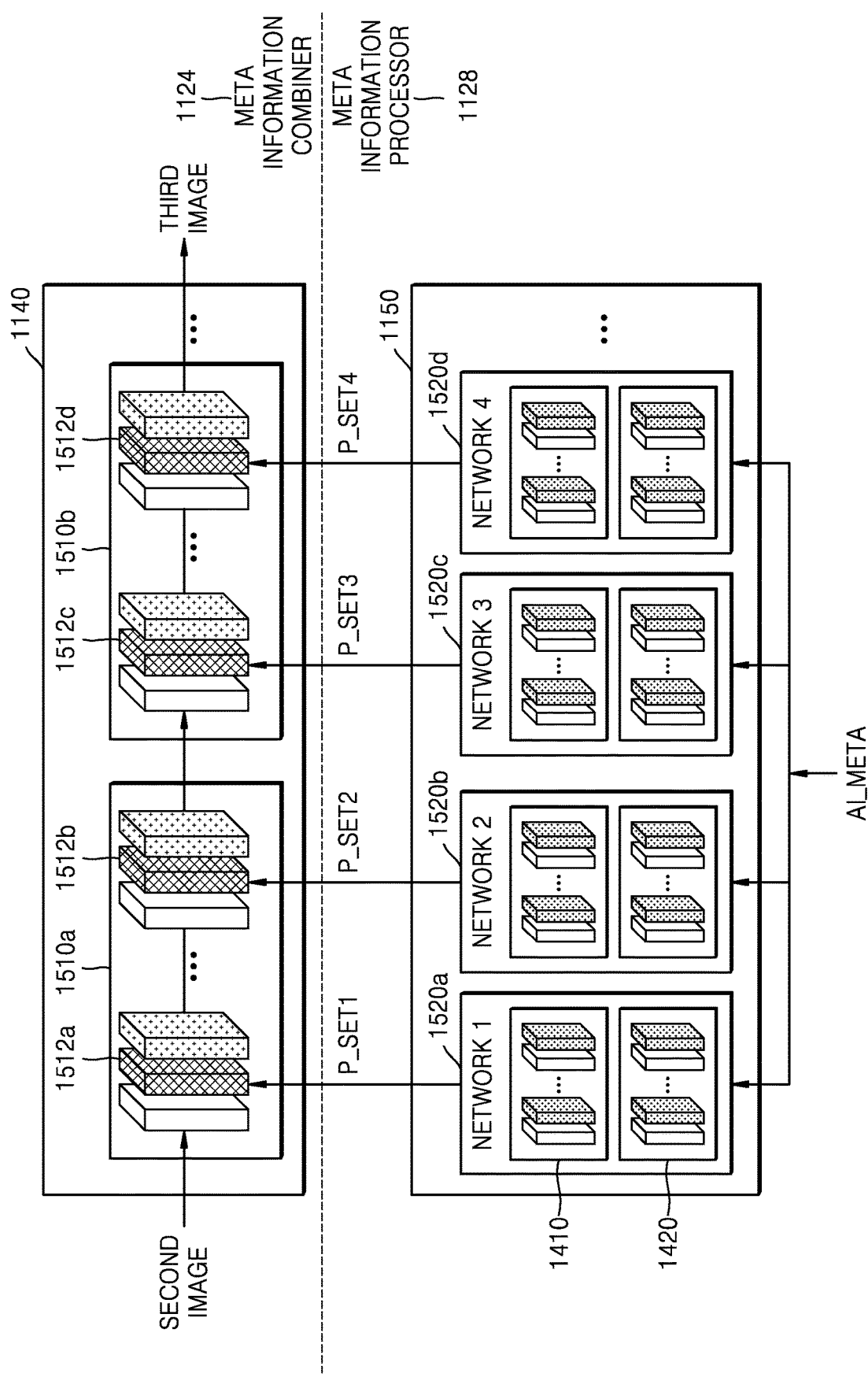
FIG. 15A illustrates a structure of a first-sub AI network and a second-sub AI network, according to an embodiment of the disclosure.

FIG. 15A illustrates a structure of a third-sub AI network and a fourth-sub AI network according to an embodiment of the disclosure.

According to an embodiment of the disclosure, the fourth-sub AI network 1150 may include as many modulation parameter generation networks 1520*a*, 1520*b*, 1520*c*, and 1520*d* as modulation layers 1512*a*, 1512*b*, 1512*c*, and 1512*d* included in the first image-quality processor 1210 of the third-sub AI network 1140. Each of the plurality of modulation parameter generation networks 1520*a*, 1520*b*, 1520*c*, and 1520*d* may receive AI metadata AI_META, and generate and output modulation parameters P_SET1, P_SET2, P_SET3, and P_SET4 corresponding to the modulation layers 1512*a*, 1512*b*, 1512*c*, and 1512*d* corresponding to the modulation parameter generation networks 1520*a*, 1520*b*, 1520*c*, and 1520*d*. Each of the modulation parameter generation networks 1520*a*, 1520*b*, 1520*c*, and 1520*d* may include the first modulation parameter generator 1410 and the second modulation parameter generator 1420. According to an embodiment of the disclosure, the plurality of modulation parameter generation networks 1520*a*, 1520*b*, 1520*c*, and 1520*d* may share some layers or may not share layers with one another.

Figure 15B:
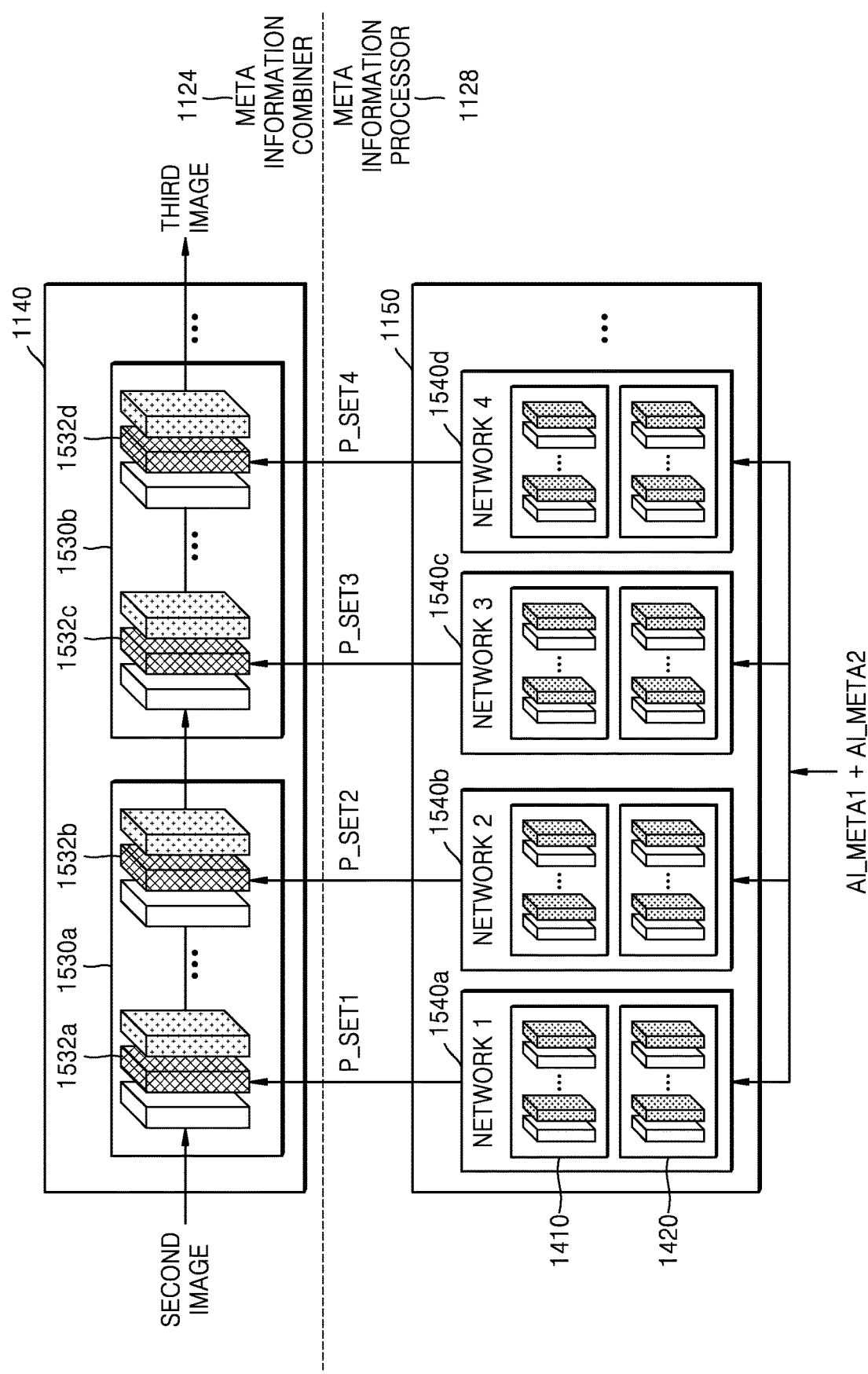
FIG. 15B illustrates a structure of a first-sub AI network and a second-sub AI network, according to an embodiment of the disclosure.

FIG. 15B illustrates a structure of a third-sub AI network and a fourth-sub AI network according to an embodiment of the disclosure. According to an embodiment of the disclosure, the image reproducing apparatus 150 may receive a plurality of AI metadata corresponding to a plurality of image features from the image providing apparatus 110. The plurality of image features may include at least one or a combination of an object, a frequency, a texture, semantics, or a photographing parameter. The image reproducing apparatus 150 may include modulation parameter generation networks 1540*a*, 1540*b*, 1540*c*, and 1540*d* corresponding to image features. For example, the image reproducing apparatus 150 may receive first AI metadata AI_META1 corresponding to an object feature and second AI metadata AI_META2 corresponding to a frequency feature. The first AI metadata AI_META1 may include class information and a plurality of class maps, and the second AI metadata AI_META2 may include frequency information and a plurality of frequency maps. The first AI metadata AI_META1 and the second AI metadata AI_META2 may be transmitted to the image reproducing apparatus 150 in a lightweighted and compressed form, and may be transmitted to the fourth-sub AI network 1150 by the meta information reconstructor 1126 through decompression and lightweighting restoration.

The modulation parameter generation networks 1540*a*, 1540*b*, 1540*c*, and 1540*d* may receive the first AI metadata AI_META1 and the second AI metadata AI_META2 and generate a first modulation parameter P_SET1, a second modulation parameter set P_SET2, a third modulation parameter set P_SET3, and a fourth modulation parameter set P_SET4. As the number of types of an input image feature increases, the modulation parameter generation networks 1540*a*, 1540*b*, 1540*c*, and 1540*d* may be trained to receive a combination of AI metadata corresponding to each image feature and generate a modulation parameter.

According to an embodiment of the disclosure, the modulation parameter generation networks 1540*a*, 1540*b*, 1540*c*, and 1540*d* may correspond to certain image features, respectively. For example, the modulation parameter generation networks 1540*a* and 1540*b* may correspond to object features, and the modulation parameter generation networks 1540*c* and 1540*d* may correspond to frequency features. The modulation parameter generation networks 1540*a* and 1540*b* corresponding to object features may input the first modulation parameter set P_SET1 and the second modulation parameter set P_SET2 to modulation layers 1532*a* and 1532*b* of a first residual block 1530*a*. The modulation parameter generation networks 1540*c* and 1540*d* corresponding to frequency features may receive the second AI metadata AI_META2 and generate the third modulation parameter set P_SET3 and the fourth modulation parameter set P_SET4. The modulation parameter generation networks 1540*c* and 1540*d* corresponding to frequency features may input the third modulation parameter set P_SET3 and the fourth modulation parameter set P_SET4 to modulation layers 1532*c* and 1532*d* of a second residual block 1530*b*.

The modulation parameter generation networks 1540*a*, 1540*b*, 1540*c*, and 1540*d* corresponding to the respective image features may be activated upon input of AI metadata corresponding to a corresponding image feature. The image reproducing apparatus 150 may include the modulation parameter generation networks 1540*a*, 1540*b*, 1540*c*, and 1540*d* corresponding to the plurality of image features, and may selectively activate the modulation parameter generation networks 1540*a*, 1540*b*, 1540*c*, and 1540*d* according to the image feature corresponding to the input AI metadata. Upon input of the AI metadata, the meta information processor 1128 may recognize an image feature corresponding to the AI metadata and transmit the AI metadata to the modulation parameter generation networks 1540*a*, 1540*b*, 1540*c*, and 1540*d* corresponding to an image feature of the AI metadata. As the modulation parameter sets P_SET1, P_SET2, P_SET3, and P_SET4 are generated from the modulation parameter generation networks 1540*a*, 1540*b*, 1540*c*, and 1540*d* according to the image feature corresponding to the AI metadata and are input to the modulation layers 1532*a*, 1532*b*, 1532*c*, and 1532*d*, the modulation layers 1532*a*, 1532*b*, 1532*c*, and 1532*d* may be activated and image-quality processing may be performed by the modulation layers 1532*a*, 1532*b*, 1532*c*, and 1532*d* activated for the second image.

Figure 16:
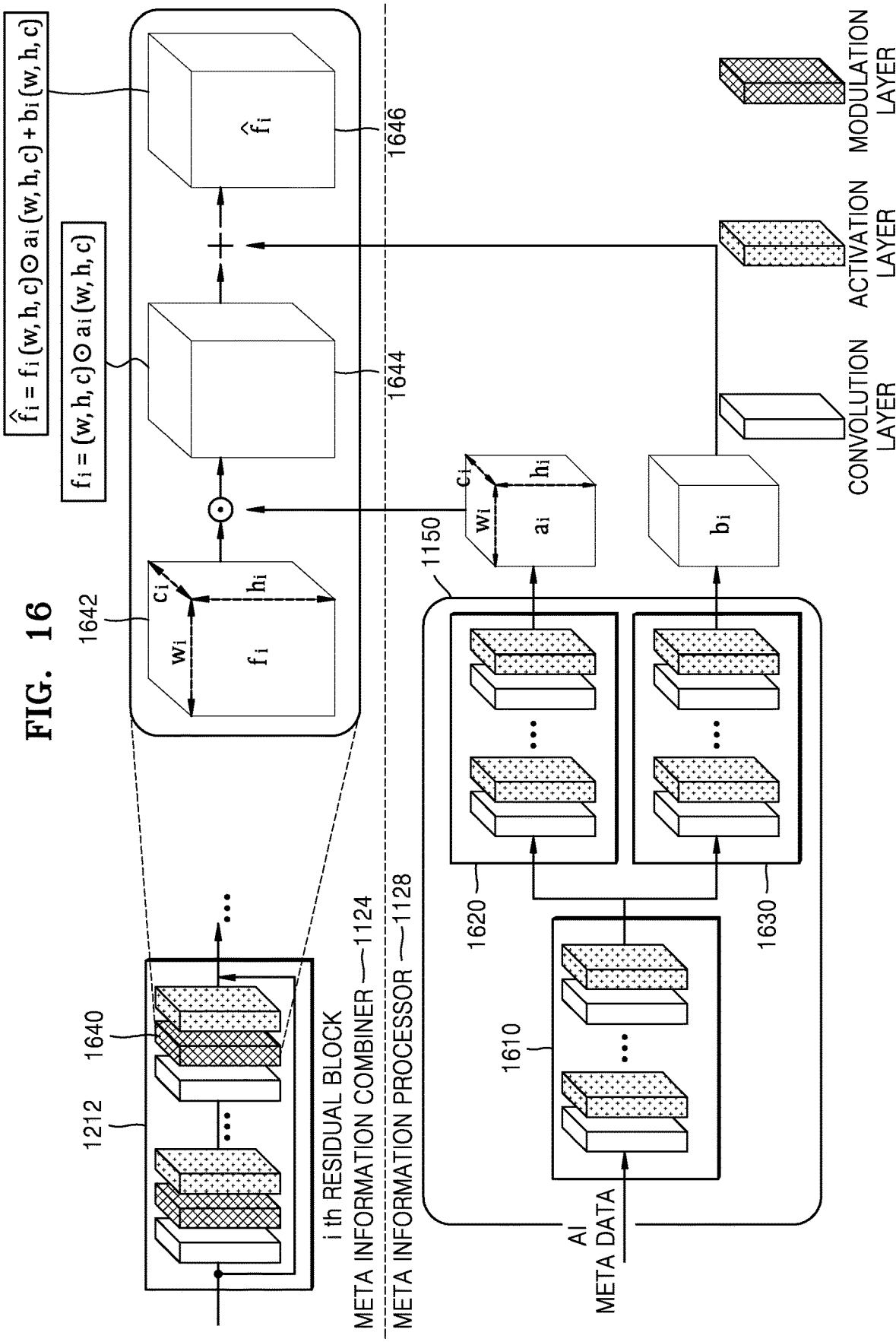
FIG. 16 illustrates an operation of a metadata combiner and a metadata processor, according to an embodiment of the disclosure.

FIG. 16 illustrates an operation of a metadata combiner and a metadata processor, according to an embodiment of the disclosure.

The metadata combiner may include at least one residual block 1212, each of which may include at least one modulation layer 1640. Each modulation layer 1640 may receive a modulation parameter set generated individually for each modulation layer 1640.

According to an embodiment of the disclosure, the modulation parameter set input to the modulation layer 1640 of the residual block 1212 may include a first operation modulation parameter $a_i$ for multiplication with the input data and a second operation modulation parameter $b_i$ for addition with the input data. An input value $f_i$ of the modulation layer 1640 may have an input feature map $f_i(w, h, c)$ 1642 having a width w, a length c, and a height h. Herein, w, c, and h may indicate the number of elements, and may be defined as natural numbers. The first operation modulation parameter $a_i$ may have a form of a weight map $a_i(w, h, c)$ having the same size as $f_i(w, h, c)$. The second operation modulation parameter $b_i$ may have a form of a weight map $b_i(w, h, c)$ having the same size as $f_i(w, h, c)$. The input feature map 1642, the first operation modulation parameter $a_i$, and the second operation modulation parameter $b_i$ may have w*h*c element values, respectively.

The fourth-sub AI network 1150 may receive AI metadata and generate the first operation modulation parameter $a_i$ and the second operation modulation parameter $b_i$ corresponding to each modulation layer 1640. The fourth-sub AI network 1150 may include a common layer 1610 used commonly for generation of the first operation modulation parameter $a_i$ and generation of the second operation modulation parameter $b_i$, a first operation modulation parameter generation layer 1620 for generating the first operation modulation parameter $a_i$, and a second operation modulation parameter generation layer 1630 for generating the second operation modulation parameter $b_i$. Arrangement and connection of the common layer and the separate layers for generation of the first operation modulation parameter $a_i$ and generation of the second operation modulation parameter $b_i$ may be determined variously.

The modulation layer 1640 may receive the first operation modulation parameter $a_i$ and perform multiplication with the input feature map $f_i$ input from a previous layer. The modulation layer 1640 may perform point-wise multiplication that multiplies element values at the same position in multiplication of the input feature map $f_i$ by the first operation modulation parameter $a_i$. The modulation layer 1640 may add a multiplication result value 1644 using the first operation modulation parameter $a_i$ and the second operation modulation parameter $b_i$, thus generating an output value $\hat{f}_i$ 1646 of the modulation layer 1640. When the modulation layer 1640 adds the multiplication result value 1644 and the second operation modulation parameter $b_i$, the modulation layer 1640 may add element values at the same position. $\hat{f}_i$ 1646 may be defined as in Equation 3.

$$\hat{f}_i = f_1(w,h,c) \odot a_i(w,h,c) + b_i(w,h,c) \quad \text{[Equation 3]}$$

Each of the plurality of modulation layers 1640 may generate an operation result value as in Equation 3 and output the operation result value to a subsequent layer. The metadata processor 1128 may perform image-quality enhancement through processing of the plurality of modulation layers 1640 included in the third-sub AI network 1140, and obtain a high-quality image with a reconstructed texture of the image.

According to another embodiment of the disclosure, an output value $\hat{f}_i$ of the modulation layer 1640 may be defined as in Equation 4. According to the current embodiment of the disclosure, the output value of the modulation layer 1640 may be defined by a multi-dimensional function. The fourth-sub AI network 1140 may generate and output $a_i, b_i, \ldots$, and $n_i$ defined in Equation 4 for each modulation layer 1640.

$$\hat{f}_i = a_i \odot f_i^n + b_i \odot f_i^{n-1} + \ldots + n_i \quad \text{[Equation 4]}$$

According to another embodiment of the disclosure, an output value $\hat{f}_i$ of the modulation layer 1640 may be defined as in Equation 5. According to the current embodiment of the disclosure, the output value of the modulation layer 1640 may be defined by a log function. The fourth-sub AI network 1140 may generate and output $a_i, b_i, \ldots$, and $n_i$ defined in Equation 5 for each modulation layer 1640.

$$\hat{f}_i = a_i \log(f_i^n) + b_i \log(f_i^{n-1}) + \ldots + n_i \quad \text{[Equation 5]}$$

According to another embodiment of the disclosure, the output value $\hat{f}_i$ of the modulation layer 1640 may be defined as in Equation 6. According to the current embodiment of the disclosure, the output value of the modulation layer 1640 may be defined by a log function. The fourth-sub AI network 1140 may generate and output $a_i, b_i, \ldots$, and $n_i$ defined in Equation 6 for each modulation layer 1640.

$$\hat{f}_i = \exp(a_i \odot f_i) + \exp(b_i \odot f_i) + \ldots \quad \text{[Equation 6]}$$

According to an embodiment of the disclosure, the third-sub AI network 1140 may include a combination of modulation layers 1640 having different modulation functions. For example, the first modulation layer may perform modulation based on Equation 4, and the second modulation layer may perform modulation based on Equation 6.

According to an embodiment of the disclosure, the function of the modulation layer 1640 of the third-sub AI network 1140 may vary with a type of an input image feature and a combination of image features. For example, when AI metadata for an object is input, the third-sub AI network 1140 may perform image-quality processing based on the modulation layer 1640 using Equation 3; when the AI metadata for the object and AI metadata for a frequency are both input, the third-sub AI network 1140 may perform image-quality processing based on the modulation layer 1640 using Equation 4. The processor 1120 may change a type of modulation performed by the modulation layer 1640 according to a type of an image feature corresponding to input AI metadata and a combination of image features. For example, the AI metadata may include information about a type of an image feature corresponding to AI metadata, and the meta information processor 1128 may generate a modulation processing parameter corresponding to a type of modulation according to a type of an image feature corresponding to the AI metadata and output the modulation parameter to the meta information combiner 1124. The meta information combiner 1124 may set a type of modulation based on a modulation parameter, and perform modulation.

The modulation layer 1640 may perform modulation on an input feature map using Equation 3 and enhance the quality of the second image. The modulation layer 1640 may reconstruct an object-related texture of the second image through modulation using a modulation parameter set determined by the fourth-sub AI network 1150 and generate the third image having a texture that is almost similar with the original image. In particular, with a modulated image using the modulation parameter set determined by the fourth-sub AI network 1150, a detailed part of an image related to an image feature of an object, a frequency, etc., of the original image may be reconstructed to enhance the quality of the third image.

Figure 17:
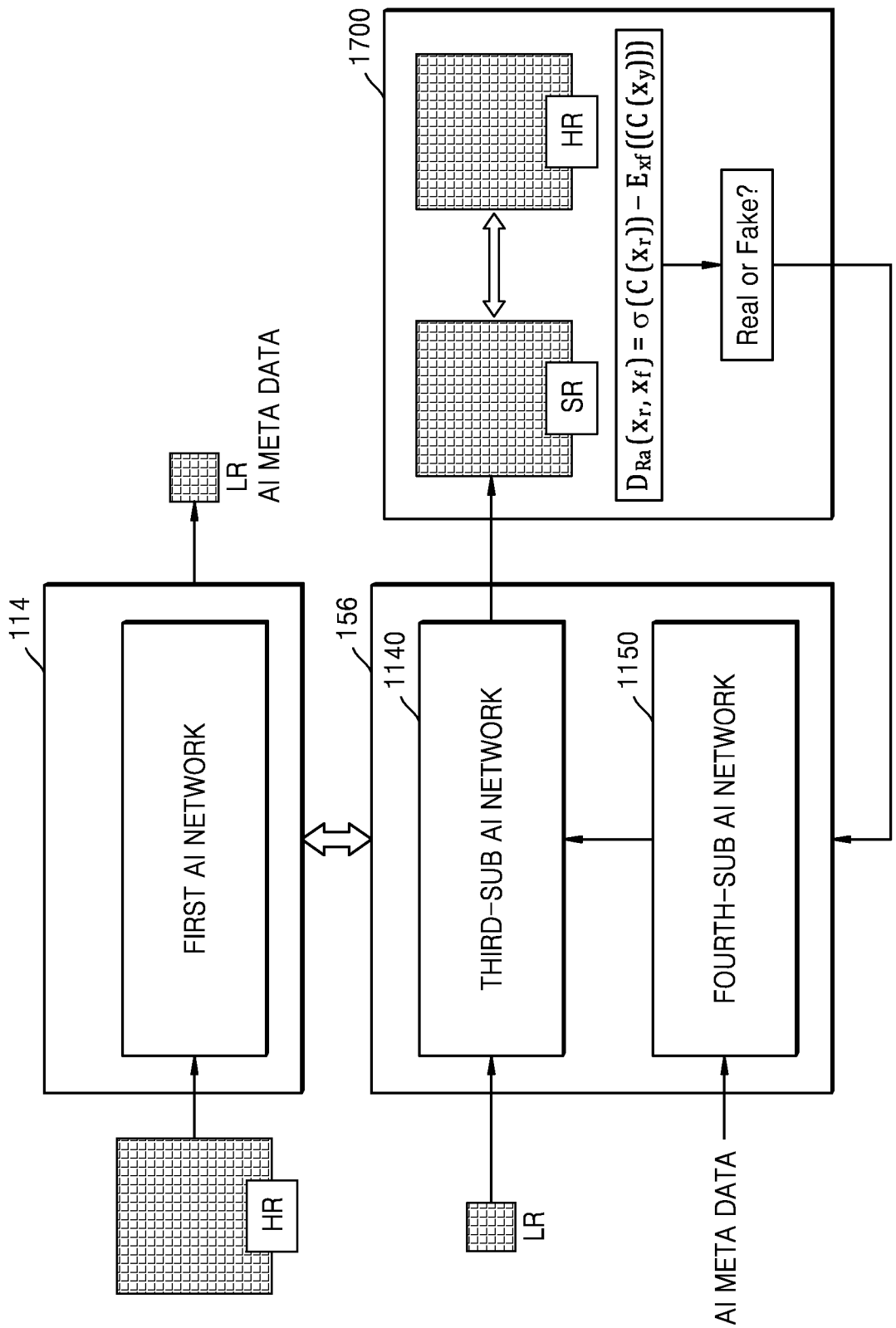
FIG. 17 is a diagram for describing a training method for a first AI network of an image providing apparatus and a training method for a second AI network of an image reproducing apparatus, according to an embodiment of the disclosure.

FIG. 17 is a diagram for describing a training method for a first AI network of an image providing apparatus and a training method for a second AI network of an image reproducing apparatus, according to an embodiment of the disclosure.

According to an embodiment of the disclosure, a second AI network of an image reproducing apparatus may be trained using multiple training data including a low-resolution image LR, AI metadata, and a high-resolution image HR. According to an embodiment of the disclosure, a training processor 1700 that trains a second AI network may input the low-resolution image LR and the AI metadata to the second AI network 156, compare the super-resolution image SR generated from the second AI network 156 with the high-resolution image HR, and update the second AI network 156 based on a comparison result. The second AI network 156 may compare the high-resolution image HR with the super-resolution image SR by using various types of generative adversarial network (GAN) algorithms, and update the second AI network 156 based on a comparison result.

According to an embodiment of the disclosure, the second AI network may be trained based on an enhanced super-resolution generative adversarial network (ESRGAN) algorithm. The training processor 1700 may predict a probability that a real image $x_r$ is more realistic than a fake image $x_f$, by using a relativistic discriminator. Herein, the real image $x_r$ may correspond to the high-resolution image HR, and the fake image $x_f$ may correspond to the super-resolution image. To this end, the training processor 1700 may compare the super-resolution image SR with the high-resolution image HR by using a relativistic discriminator $D_{Ra}$. The relativistic discriminator $D_{Ra}$ may calculate a discrimination result value based on Equation 7.

$$D_{Ra}(x_r, x_f) = \sigma(C(x_r)) - E_{x_f}((C(x_f)))$$ [Equation 7]

Herein, $\sigma$ may indicate a sigmoid function, $C(x)$ may mean an output of a discriminator that discriminates whether the input image is a real image, and $E_{x_f}(.)$ may mean an average operation with respect to all fake data in a mini batch. The training processor 1700 may perform training by updating parameter values of the second AI network 156, based on a processing result of the relativistic discriminator $D_{Ra}$.

According to an embodiment of the disclosure, the first AI network 114 and the second AI network 156 may be trained jointly with each other. The training processor 1700 may generate the super-resolution image SR based on processing of the first AI network 114 and the second AI network 156 by using training data including the high-resolution image HR, and update the first AI network 114 and the second AI network 156 based on a result of comparison between the high-resolution image HR and the super-resolution image SR.

According to another embodiment of the disclosure, training of the first AI network 114 and the second AI network 156 may include individual training for training the first AI network 114 and the second AI network 156, respectively, and joint training between the first AI network 114 and the second AI network 156. Individual training may separately train the first AI network 114 and the second AI network 156 by using multiple training data including the high-resolution image HR, the low-resolution image LR, and the AI metadata. Afterward, the training processor 1700 performs joint training on the first AI network 114 and the second AI network 156, which are individually trained, by using the high-resolution image HR. Through a joint training process, the individually trained first AI network 114 and second AI network 156 may be additionally updated.

Figure 18:
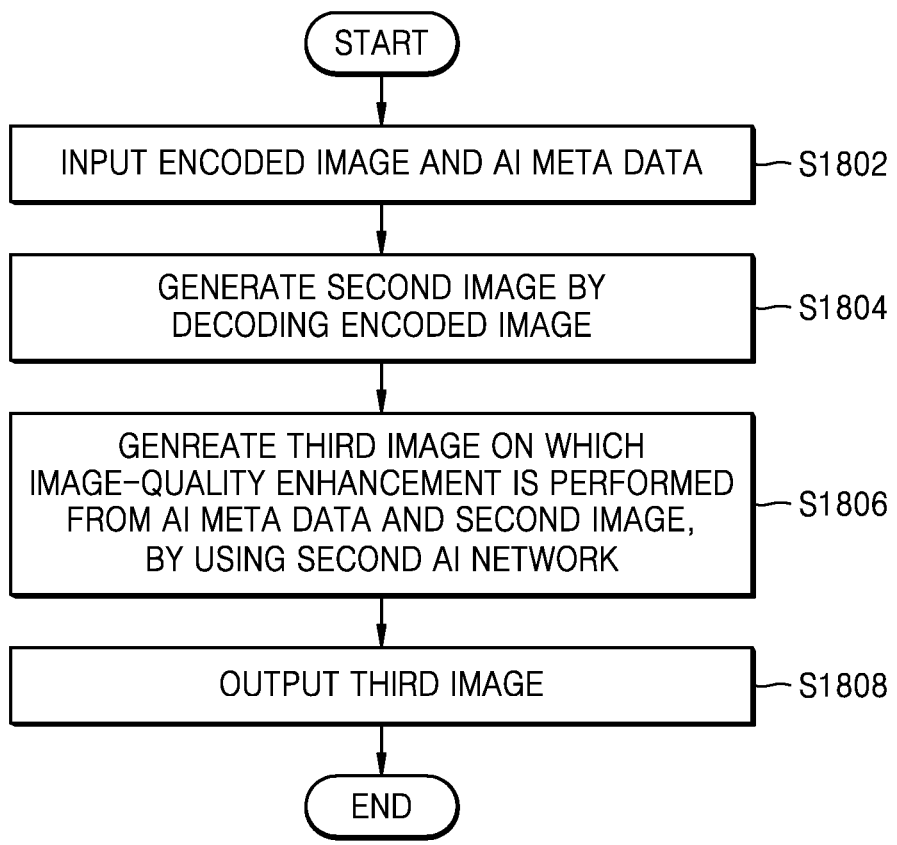
FIG. 18 is a flowchart illustrating a control method for an image reproducing apparatus, according to an embodiment of the disclosure.

FIG. 18 is a flowchart illustrating a control method for an image reproducing apparatus, according to an embodiment of the disclosure.

Each of operations of the control method for the image reproducing apparatus according to the disclosure may be performed by various types of an electronic device including an input interface, a processor, a memory, and an output interface, and using a machine-trained model. The embodiment will now be described in which the image reproducing apparatus 150 according to embodiments of the disclosure performs the control method for the image reproducing apparatus. Thus, embodiments described for the image reproducing apparatus 150 are applicable to embodiments for the control method for the image reproducing apparatus, and on the other hand, embodiments described for the control method for the image reproducing apparatus are applicable to embodiments for the image reproducing apparatus 150. The control method for the image reproducing apparatus according to the embodiments of the disclosure may not be limited to an embodiment in which the control method is performed by the image reproducing apparatus 150, and the control method may be performed by various types of the electronic device.

The image reproducing apparatus may receive an encoded image and AI metadata in operation S1802. The AI metadata may be generated by the image providing apparatus. The AI metadata may be input to the image reproducing apparatus in a lightweighted and compressed form. The AI metadata may include class information and a plurality of class maps corresponding to an encoded image.

Next, the image reproducing apparatus may decode the encoded image to generate a second image in operation S1804. The image reproducing apparatus may perform decoding corresponding to encoding used in the image providing apparatus with respect to an encoded image encoded by the image providing apparatus, thus generating the second image. Decoding may be the same as or similar with operations of the decoder 1110 described above, and thus will not be redundantly described.

The image reproducing apparatus may generate an image-quality enhanced third image from the AI metadata and the second image by using the second AI network, in operation S1806. The image reproducing apparatus may decompression and lightweighting reconstruction on the AI metadata. The AI metadata may be reconstructed into class information and a plurality of reconstructed class maps through decompression and lightweighting reconstruction. The class information and the plurality of reconstructed class maps may be transformed into a plurality of modulation parameter sets through the fourth-sub AI network. The fourth-sub AI network may generate a modulation parameter set for each of modulation layers in a residual block for image-quality processing. The image reproducing apparatus may perform image-quality processing on the second image by using the third-sub AI network. The third-sub AI network may include at least one residual block, each of which may include at least one modulation layer. The modulation layer may be configured with the parameter by the modulation parameter set generated by the fourth-sub AI network. The feature map generated from the second image may be processed by at least one residual block. The modulation layer in the residual block may perform image-quality processing on the feature map. The modulation layer may perform image-quality processing on the feature map by using, for example, Affine transformation. The third-sub AI network may perform image-quality processing on the second image to generate and output the third image. Image-quality enhancement may be the same as or similar with operations of the image quality processor 1120 described above, and thus will not be redundantly described.

Next, the image reproducing apparatus may output the third image in operation S1808. The image reproducing apparatus may display the third image or transmit and output the third image to another device. Output processing may be the same as or similar with operations of the output interface 160 described above, and thus will not be redundantly described.

Figure 19:
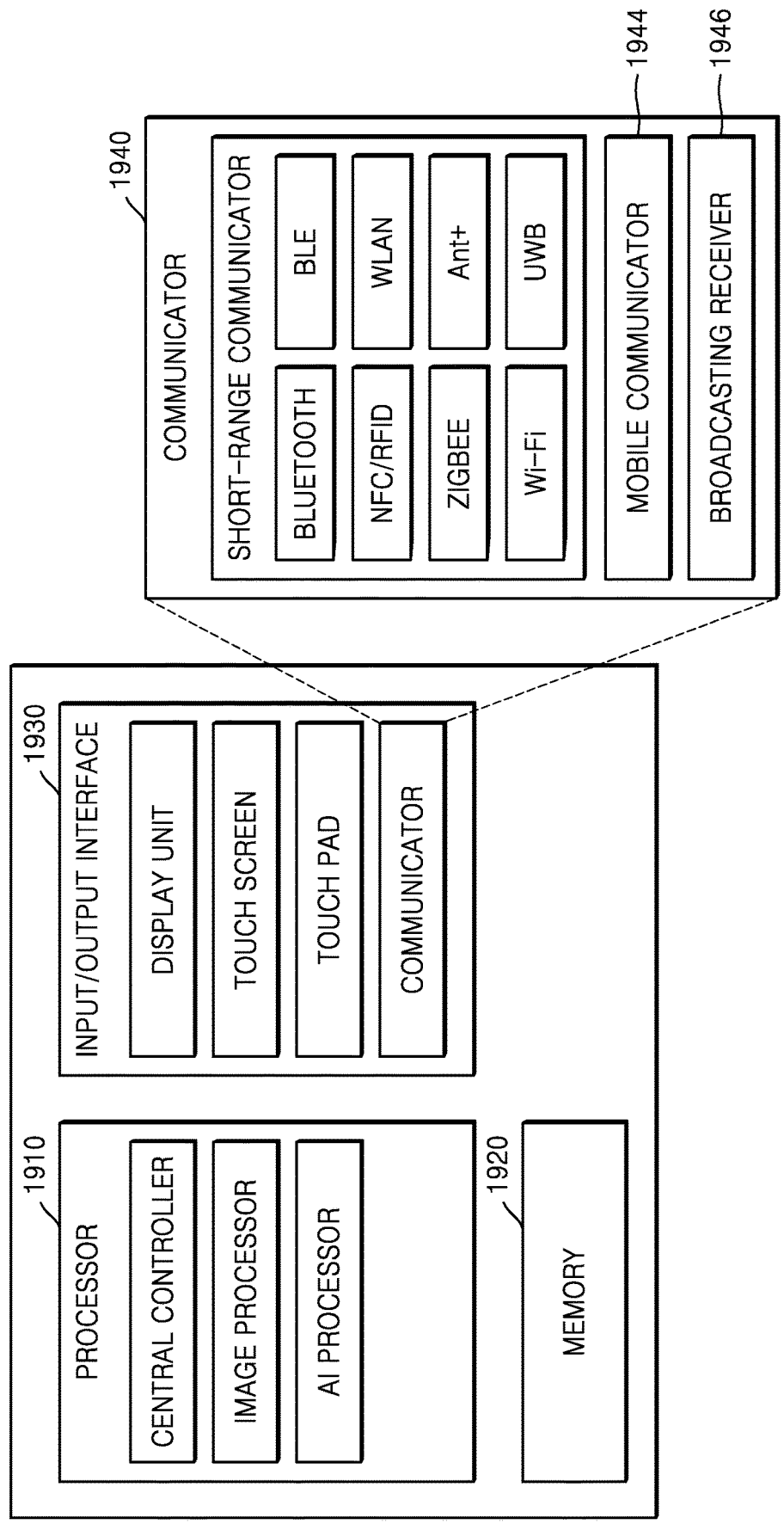
FIG. 19 is a diagram illustrating a structure of an image providing apparatus and an image reproducing apparatus, according to an embodiment of the disclosure.

FIG. 19 is a diagram illustrating a structure of an image providing apparatus and an image reproducing apparatus, according to an embodiment of the disclosure.

The image providing apparatus and the image reproducing apparatus may be implemented with an electronic device 1900 in various forms. The electronic device 1900 may include a processor 1910, a memory 1920, and an input/output interface 1930. The processor 112 of the image providing apparatus 110 may correspond to the processor 1910 of the electronic device 1900, the memory 116 of the image providing apparatus 110 may correspond to the memory 1920 of the electronic device 1900, and the output interface 118 of the image providing apparatus 110 may correspond to the input/output interface 1930 of the electronic device 1900. The input interface 152 and the output interface 160 of the image reproducing apparatus 150 may correspond to the input/output interface 1930 of the electronic device 1900, the processor 154 of the image reproducing apparatus 150 may correspond to the processor 1910 of the electronic device 1900, and the memory 158 of the image reproducing apparatus 150 may correspond to the memory 1920 of the electronic device 1900.

The processor 1910 may include one or more processor. The processor 1910 may include a dedicated processor such as a central controller, an image processor, an AI processor, etc.

The memory 1920 may include a volatile and/or nonvolatile memory, or a combination thereof. The memory 1920 may include various types of memories such as a main memory, a cache memory, a register, a non-volatile memory, etc. The memory 1920 may be implemented in various forms of storage media. For example, the memory 1920 may include a storage medium of at least one type of a flash memory type, a hard disk type, a multimedia card micro type, a card type memory (e.g., an SD or XD memory, etc.), RAM, SRAM, ROM, EEPROM, PROM, a magnetic memory, a magnetic disk, an optical disk, and so forth.

The input/output interface 1930 may include various types of input/output interfaces and a communicator 1940. The input/output interface 1930 may include a display, a touch screen, a touch pad, a communicator, or a combination thereof. The communicator 1940 may include various types of communication modules. The communicator 1940 may include a short-range communicator 1942, a mobile communicator 1944, or a broadcasting receiver 1946. The short-range communicator 1942 may perform Bluetooth communication, Bluetooth Low Energy (BLE), near-field communication (NFC), radio frequency identification (RFID), wireless local area network (WLAN) (Wireless Fidelity (WiFi)), ZigBee, infrared Data Association (IrDA0 communication, WiFi Direct (WFD), ultra wideband (UWB), Ant+ communication, or communication based on a combination thereof.

Meanwhile, the foregoing embodiments of the disclosure may be written as a program executable on a computer and the written program may be stored in a medium.

The medium may continuously store the computer-executable program or temporarily store the computer-executable program for execution or downloading. The medium may be various recording means or storage means in which a single or several hardware are combined, and may exist in a distributed manner on a network without being directly connected to a certain computer system. Examples of the medium may include magnetic media such as hard disk, floppy disk, and magnetic tape, optical media such as compact disk read only memory (CD-ROM) and digital versatile disk (DVD), magneto-optical media such as floptical disk, and a device configured to store a program instruction, such as ROM, RAM and flash memory, etc. As an example of another medium, there may be a recording medium or a storage medium managed by an application store that distributes an application, a site or server that supplies or distributes various software, etc.

Meanwhile, the AI network model may be implemented as a software module. When the AI network model is implemented with the software module (e.g., a program module including an instruction), the AI network model may be stored in a computer-readable recording medium.

The AI network model may be integrated in the form of a hardware chip and may be a part of the image providing apparatus or the image reproducing apparatus. For example, the AI network model may be manufactured in the form of a dedicated hardware chip for AI or may be manufactured as a part of an existing general-purpose processor (e.g., a central processing unit (CPU) or an application processor) or a graphics-dedicated processor (e.g., a graphics processing unit (GPU)).

The AI network model may be provided in a downloadable software form. The computer program product may include a product (e.g., a downloadable application) in the form of a software program electronically distributed through a manufacturer or the electronic market. For the electronic distribution, at least a part of the software program may be stored in a storage medium or temporarily generated. In this case, the storage medium may be a storage medium of a server in the manufacturer or the electronic market or a relay server.

According to the embodiments of the disclosure, an AI network for improving image quality used to generate AI metadata may be lightweighted.

Moreover, according to the embodiments of the disclosure, the AI network used to process image quality in an image reproducing apparatus may be lightweighted.

Furthermore, according to the embodiments of the disclosure, the performance of the AI image-quality network may be improved by generating AI metadata from the original image.

While the technical spirit of the disclosure has been described in detail with reference to exemplary embodiments of the disclosure, various modifications and changes may be possible by those of ordinary skill in the art within the range of the technical spirit of the disclosure.

What is claimed is:

1. An image providing apparatus comprising:
a memory storing one or more instructions;
one or more processors configured to execute the one or more instructions stored in the memory; and
an output interface,
wherein the one or more processors, by executing the one or more instructions, are configured to:
generate, by using a first artificial intelligence (AI) network, AI metadata comprising class information and at least one class map, wherein the class information comprises at least one class, each of the at least one class corresponds to a type of an object included in a first image among a plurality of predefined objects, and each of the at least one class map indicates regions corresponding to each class among the at least one class in the first image;
generate an encoded image by encoding the first image; and
output the encoded image and the AI metadata through the output interface.

2. The image providing apparatus of claim 1, wherein the one or more processors, by executing the one or more instructions, are configured to:
input the first image to the first AI network and generate a plurality of segmentation probability maps for types of the plurality of predefined objects;
define the at least one class based on the plurality of segmentation probability maps;
generate the class information comprising the at least one class; and
generate the at least one class map for each class of the at least one class from the plurality of segmentation probability maps.

3. The image providing apparatus of claim 2, wherein the one or more processors, by executing the one or more instructions, are configured to:
calculate an average value of pixels except for at least one pixel having a value of 0 for each of the plurality of segmentation probability maps; and
select a subset of objects from among the plurality of predefined objects and define the at least one class, based on a magnitude of the average value of each of the plurality of segmentation probability maps.

4. The image providing apparatus of claim 3, wherein the one or more processors, by executing the one or more instructions, are configured to:
map at least some objects from among objects other than the subset of objects among the plurality of predefined objects to the at least one class; and
generate the at least one class map by combining the plurality of segmentation probability maps.

5. The image providing apparatus of claim 1, wherein the one or more processors, by executing the one or more instructions, are configured to:
generate a segmentation probability map for a frequency for each of a plurality of predefined frequency domains from the first AI network; and
generate AI metadata based on the segmentation probability map for the frequency, in which the AI metadata comprises frequency information, which comprises information about a frequency domain for the first image, and at least one frequency map corresponding to each frequency domain included in the frequency information.

6. The image providing apparatus of claim 1, wherein the first image comprises a plurality of images, and the class information and the at least one class map are generated for each of the plurality of images, and
the one or more processors, by executing the one or more instructions, are configured to:
define at least one sequence comprising at least one image from the plurality of images; and
generate, for each sequence among the at least one sequence, sequence class information indicating information about a class included in the at least one image included in the sequence, and frame class information indicating information about a class included in each of the at least one image included in the sequence, in which the frame class information indicates a combination of classes included in a frame among classes included in the sequence class information and comprises a number of bits less than the sequence class information.

7. The image providing apparatus of claim 1, wherein the one or more processors, by executing the one or more instructions, are configured to:
generate, based on the at least one class map, a lightweighted class map in which each pixel has a representative value corresponding to a class among the at least one class;
generate lightweighted AI metadata comprising the class information and the lightweighted class map; and
output the encoded image and the lightweighted class map through the output interface.

8. The image providing apparatus of claim 1, wherein the first AI network comprises:
a first-sub AI network comprising at least one convolution layer and at least one maximum pooling layer, and configured to generate a feature map from the first image; and
a second-sub AI network comprising a first layer group that comprises at least one convolution layer and at least one activation layer and receives and processes the feature map from the first-sub AI network, an up-scaler configured to upscale an output of the first layer group, and a second layer group that comprises at least one convolution layer and at least one minimum pooling layer and receives an output of the up-scaler and generates a segmentation probability map for each object of the plurality of predefined objects.

9. The image providing apparatus of claim 1, wherein the first AI network is trained jointly with a second AI network, and
the second AI network is included in a device configured to receive the encoded image and the AI metadata and decode the encoded image, and perform image-quality processing on image data of the AI metadata, the image data corresponding to the encoded image.

10. The image providing apparatus of claim 1, wherein the one or more processors, by executing the one or more instructions, are configured to generate the encoded image by down-scaling and encoding the first image.

11. A control method for an image providing apparatus, the control method comprising:
- generating, by using a first artificial intelligence (AI) network, AI metadata comprising class information and at least one class map, wherein the class information comprises at least one class, each of the at least one class corresponds to a type of an object included in a first image among a plurality of predefined objects, and each of the at least one class map indicates regions corresponding to each class among the at least one class in the first image;
- generating an encoded image by encoding the first image; and
- outputting the encoded image and the AI metadata.

12. The control method of claim 11, further comprising:
- inputting the first image to the first AI network and generating a plurality of segmentation probability maps for types of the plurality of predefined objects;
- defining at least one class based on the plurality of segmentation probability maps;
- generating the class information comprising the at least one class; and
- generating the at least one class map for each class of the at least one class from the plurality of segmentation probability maps.

13. The control method of claim 12, further comprising:
- calculating an average value of pixels except for at least one pixel having a value of 0 for each of the plurality of segmentation probability maps; and
- selecting a subset of objects from among the plurality of predefined objects and defining the at least one class, based on a magnitude of the average value of each of the plurality of segmentation probability maps.

14. The control method of claim 13, further comprising:
- mapping at least some objects from among objects other than the subset of objects among the plurality of predefined objects to the at least one class; and
- generating the at least one class map by combining the plurality of segmentation probability maps.

15. The control method of claim 11, further comprising:
- generating a segmentation probability map for a frequency for each of a plurality of predefined frequency domains from the first AI network; and
- generating AI metadata based on the segmentation probability map for the frequency, in which the AI metadata comprises frequency information, which comprises information about a frequency domain for the first image, and at least one frequency map corresponding to each frequency domain included in the frequency information.

16. The control method of claim 11, wherein the first image comprises a plurality of images, and the class information and the at least one class map are generated for each of the plurality of images, and
the control method further comprises:
- defining at least one sequence comprising at least one image from the plurality of images; and
- generating, for each sequence among the at least one sequence, sequence class information indicating information about a class included in the at least one image included in the sequence, and frame class information indicating information about a class included in each of the at least one image included in the sequence, in which the frame class information indicates a combination of classes included in a frame among classes included in the sequence class information and comprises a number of bits less than the sequence class information.

17. The control method of claim 11, further comprising:
- generating, based on the at least one class map, a lightweighted class map in which each pixel has a representative value corresponding to a class among the at least one class;
- generating lightweighted AI metadata comprising the class information and the lightweighted class map; and
- outputting the encoded image and the lightweighted class map through an output interface.

18. The control method of claim 11, wherein the first AI network comprises:
- a first-sub AI network comprising at least one convolution layer and at least one maximum pooling layer, and configured to generate a feature map from the first image; and
- a second-sub AI network comprising a first layer group that comprises at least one convolution layer and at least one activation layer and receives and processes the feature map from the first-sub AI network, an up-scaler configured to upscale an output of the first layer group, and a second layer group that comprises at least one convolution layer and at least one minimum pooling layer and receives an output of the up-scaler and generates a segmentation probability map for each object of the plurality of predefined objects.

19. The control method of claim 11, wherein the first AI network is trained jointly with a second AI network, and
the second AI network is included in a device configured to receive the encoded image and the AI metadata and decode the encoded image, and perform image-quality processing on image data of the AI metadata, the image data corresponding to the encoded image.

20. A non-transitory computer-readable recording medium having recorded thereon a computer program instructions for, when executed by a processor, performing a control method for an image providing apparatus, the control method comprising:
- generating, by using a first artificial intelligence (AI) network, AI metadata comprising class information and at least one class map, wherein the class information comprises at least one class, each of the at least one class corresponds to a type of an object included in a first image among a plurality of predefined objects, and each of the at least one class map indicates regions corresponding to each class among the at least one class in the first image;
- generating an encoded image by encoding the first image; and
- outputting the encoded image and the AI metadata.

* * * * *